US010926306B2

(12) United States Patent
Muller et al.

(10) Patent No.: US 10,926,306 B2
(45) Date of Patent: Feb. 23, 2021

(54) HAZARDOUS MATERIAL STORAGE REPOSITORY IN A SUBTERRANEAN FORMATION

(71) Applicant: Deep Isolation, Inc., Berkeley, CA (US)

(72) Inventors: Richard A. Muller, Berkeley, CA (US); Elizabeth Muller, Berkeley, CA (US)

(73) Assignee: Deep Isolation, Inc., Berkeley, CA (US)

(*) Notice: Subject to any disclaimer, the term of this patent is extended or adjusted under 35 U.S.C. 154(b) by 212 days.

(21) Appl. No.: 16/419,866

(22) Filed: May 22, 2019

(65) Prior Publication Data

US 2020/0023416 A1   Jan. 23, 2020

Related U.S. Application Data

(63) Continuation of application No. 15/997,819, filed on Jun. 5, 2018, now Pat. No. 10,300,512.

(60) Provisional application No. 62/515,050, filed on Jun. 5, 2017.

(51) Int. Cl.
| | | |
|---|---|---|
| *B01J 21/16* | (2006.01) | |
| *B09B 1/00* | (2006.01) | |
| *G21F 9/34* | (2006.01) | |
| *G21F 9/28* | (2006.01) | |
| *G21F 9/36* | (2006.01) | |

(52) U.S. Cl.
CPC ............ *B09B 1/006* (2013.01); *G21F 9/28* (2013.01); *G21F 9/34* (2013.01); *G21F 9/36* (2013.01)

(58) Field of Classification Search
CPC .. B01J 21/16; B01J 31/061; B01J 31/26; B01J 35/0033; B01J 35/026; B01J 37/0219
USPC .......................................................... 502/404
See application file for complete search history.

(56) References Cited

U.S. PATENT DOCUMENTS

| | | |
|---|---|---|
| 3,379,013 A | 4/1968 | Slagle et al. |
| 3,899,631 A | 8/1975 | Clark |
| 4,708,522 A | 11/1987 | Bergman et al. |
| 4,886,393 A | 12/1989 | Jahn-Held et al. |
| 5,165,235 A | 11/1992 | Nitschke |
| 5,202,522 A | 4/1993 | Williams |
| 5,318,382 A | 6/1994 | Cahill |
| 5,340,235 A | 8/1994 | Milliken |
| 5,377,104 A | 12/1994 | Sorrells et al. |
| 5,387,741 A | 2/1995 | Shuttle |
| 5,589,603 A | 12/1996 | Alexander et al. |
| 5,785,133 A | 7/1998 | Murray et al. |
| 5,850,614 A | 12/1998 | Crichlow |
| 5,863,283 A | 1/1999 | Gardes |
| 5,868,210 A | 2/1999 | Johnson et al. |
| 6,238,138 B1 | 5/2001 | Crichlow |
| 7,068,748 B2 | 6/2006 | Singh |
| 7,287,934 B2 | 10/2007 | Okutsu et al. |
| 8,933,289 B2 | 1/2015 | Crichlow |
| 9,852,822 B2 | 12/2017 | Singh |
| 10,002,683 B2 | 6/2018 | Muller et al. |
| 10,265,743 B1 | 4/2019 | Muller et al. |
| 10,315,238 B1 | 6/2019 | Muller |
| 10,446,287 B2 | 10/2019 | Singh |
| 10,861,614 B2 | 12/2020 | Muller et al. |
| 2002/0020528 A1 | 2/2002 | McCabe et al. |
| 2005/0207525 A1 | 9/2005 | Singh |
| 2008/0039673 A1 | 2/2008 | Maksimov |
| 2008/0308271 A1 | 12/2008 | Chouzenoux et al. |
| 2009/0135986 A1 | 5/2009 | Georgii |
| 2010/0105975 A1 | 4/2010 | Baird |
| 2011/0005762 A1 | 1/2011 | Poole |
| 2011/0054234 A1 | 3/2011 | Georgii |
| 2014/0221722 A1 | 8/2014 | Germanovich et al. |
| 2018/0144841 A1 | 5/2018 | Singh |
| 2018/0345336 A1 | 12/2018 | Muller et al. |
| 2019/0099790 A1 | 4/2019 | Muller et al. |

FOREIGN PATENT DOCUMENTS

| | | |
|---|---|---|
| CN | 101124640 | 2/2007 |
| CN | 1973339 | 5/2007 |
| CN | 101971268 | 2/2011 |
| CN | 106782735 | 5/2017 |
| GB | 2151839 | 7/1985 |
| WO | WO092007667 | 5/1992 |
| WO | WO2015069300 | 5/2015 |
| WO | WO 2016/177876 | 11/2016 |

OTHER PUBLICATIONS

Hurd, "Choosing and Using a Form Release Agent," Concrete Construction, 1996, 41(10):732-736.
[No Author] World Nuclear News, "Yucca Mountain cost estimate rises to $96 billion", Aug. 6, 2008, 2 pages, ISSN 2040-5766.
Bill W. Arnold, et al., "Reference Design and Operations of Deep Borehole Disposal of High-Level Radioactive Waste," Sandia National Laboratories (2011) ("Sandia Report") (available at: http://prod.sandia.gov/techlib/access-control.cgi/2011/116749.pdf).
Christopher Ian Hoag, "Canister Design for Deep Borehole Disposal of Nuclear Waste," Massachusetts Institute of Technology, May 2006 (pp. 1-6).

(Continued)

*Primary Examiner* — Edward M Johnson
(74) *Attorney, Agent, or Firm* — Fish & Richardson P.C.

(57) ABSTRACT

A hazardous material storage repository includes a drillhole extending into the Earth and including an entry. The drillhole includes a vertical drillhole portion, a transition drillhole portion coupled to the vertical drillhole portion, and a hazardous material storage drillhole portion coupled to the transition drillhole portion. The hazardous material storage drillhole portion is located below a self-healing geological formation and is vertically isolated, by the self-healing geological formation, from a zone that comprises mobile water. The repository includes a storage canister positioned in the hazardous material storage drillhole portion and sized to fit from the drillhole entry through the vertical drillhole portion, the transition drillhole portion, and into the hazardous material storage drillhole portion. The storage canister includes an inner cavity sized to enclose hazardous material.

20 Claims, 8 Drawing Sheets

(56) References Cited

OTHER PUBLICATIONS

Cornwall, W., "Deep Sleep. Boreholes drilled into Earth's crust get a fresh look for nuclear waste disposal," Science, vol. 349, Issue 6244, Jul. 10, 2015, 132-35.
Faybishenko et al., Editors, Lawrence Berkeley National Laboratory and Sandia National Laboratories: "International Approaches for Deep Geological Disposal of Nuclear Waste: Geological Challenges in Radioactive Waste Isolation", prepared for the US Department of Energy, Fifth Worldwide Review—2016, 474 pages.
Frances Elizabeth Dozier, "Feasibility of Very Deep Borehole Disposal of US Nuclear Defense Wastes," Massachusetts Institute of Technology, Sep. 2011 (pp. 1-12).
Gibb et al., "A Model for Heat Flow in Deep Borehole Disposals of High-Level Nuclear Waste," Journal of Geophysical Research, vol. 113, dated May 6, 2008, 18 pages.
Hiroki Sone and Mark D. Zoback, "Mechanical properties of shale-gas reservoir rocks—Part 1:Static and dynamic elastic properties and anisotropy," Geophysics, vol. 78, No. 5, Sep. Oct. 2013, D381-92.
International Search Report and Written Opinion issued in International Application No. PCT/US2016/066539, dated Apr. 19, 2017, 13 pages.
J. Winterle et al., Regulatory Perspectives on Deep Borehole Disposal Concepts, prepared for the U.S. Nuclear Regulatory Commission, Contract NRC-02-07006, Center for Nuclear Waste Regulatory Analyses, San Antonio, TX, May 2011, 24 pages.
Johnathan Sutton Gibbs, "Feasibility of Lateral Emplacement in Very Deep Borehole Disposal of High Level Nuclear Waste" master's thesis, Massachusetts Institute of Technology (2010) ("Gibbs") (available at: https://dspace.mit.edu/handle/1721.1/63242), 2 pages.
Neuzil et al., "Shale: An overlooked option forUS nuclear waste disposal," Bulletin of the Atomic Scientists Nov. 2014, Retrieved from the Internet: http://thebulletin .org/shale-overlooked-option-us-nuclear-waste-disposal7831 printed Sep. 26, 2016, 5 pages.
Neuzil, "Can Shale Safely Host U.S. Nuclear Waste?" EOS. vol. 94, No. 30, Dated Jul. 23, 2013, 3 pages.
PCT Notification of Transmittal of the International Search Report and Written Opinion in International Application No. PCT/US2018/035974, dated Aug. 24, 2018, 13 pages.

U.S. Nuclear Waste Technical Review Board, A Report to the U.S. Congress and the Secretary of Energy, Evaluation of Technical Issues Associated With the Development of a Separate Repository for U.S. Department of Energy-Managed High-Level Radioactive Waste and Spent Nuclear Fuel (2015) ("NWTRB") (available at: http://www.nwtrb.gov/reports/disposal_options.pdf).
Vartabedian, Ralph; "Decades-old war over Yucca Mountain nuclear dump resumes under Trump budget plan", Mar. 29, 2017, ralph.vartabdian@latimes.com; twitter @rvartabedian; 4 pages.
YuccaMountain.org; Eureka County, Nevada—Nuclear Waste Office, FAQ, Eureka County Home, last updated Mar. 17, 2017; 12 pages.
Performance Confirmation Concepts Study Report Civilian Radioactive Waste Management System Management & Operating Contractor TRW 1996.
United States Department of Energy, "Executive Summary—Environmental Impact Statement, Waste Isolation Pilot Plant (WIPP)," Oct. 1980, 1544 pages.
United States Department of Energy, "Quality Assurance Program Document, DOE/CBFO-94-1012 Revision 13," Carlsbad Field Office, Apr. 20, 2017, 127 pages.
United States Department of Energy, "Safety Evaluation Report Addendum for Annual Update of Waste Isolation Plant, Document Safety Analysis, Revision 6, and Technical Safety Requirements, Revision 6," dated Feb. 26, 2018, 55 pages.
United States Department of Energy, "Safety Evaluation Report for Approval of DOE/WIPP 07-3372, Waste Isolation Plant Documented Safety Analysis, Revision 5 and DOE/WIPP 07-3373, Waste Isolation Pilot Plant Technical Safety Requirements, Revision 5," dated Apr. 29, 2016, 235 pages.
United States Department of Energy, "Waste Isolation Pilot Plant, Environmental Monitoring Plan, Revision 10," dated Jun. 22, 2017, 56 pages.
United States Department of Energy, "Waste Isolation Plant, Documented Safety Analysis," Nuclear Waste Partnership LLC Carlsbad, NM, dated Feb. 2018, 777 pages.
United States Department of Energy, "Waste Isolation Plant, Final Supplement, Environmental Impact Statement," dated Jan. 1990, 1498 pages.
United States Department of Energy, "Waste Isolation Plant, Final Technical Safety Requirements," Nuclear Waste Partnership LLC Carlsbad, NM, dated Feb. 2018, 291 pages.
CN Office Action in Chinese Appln. No. 201880049476, dated Dec. 11, 2020, 9 pages.

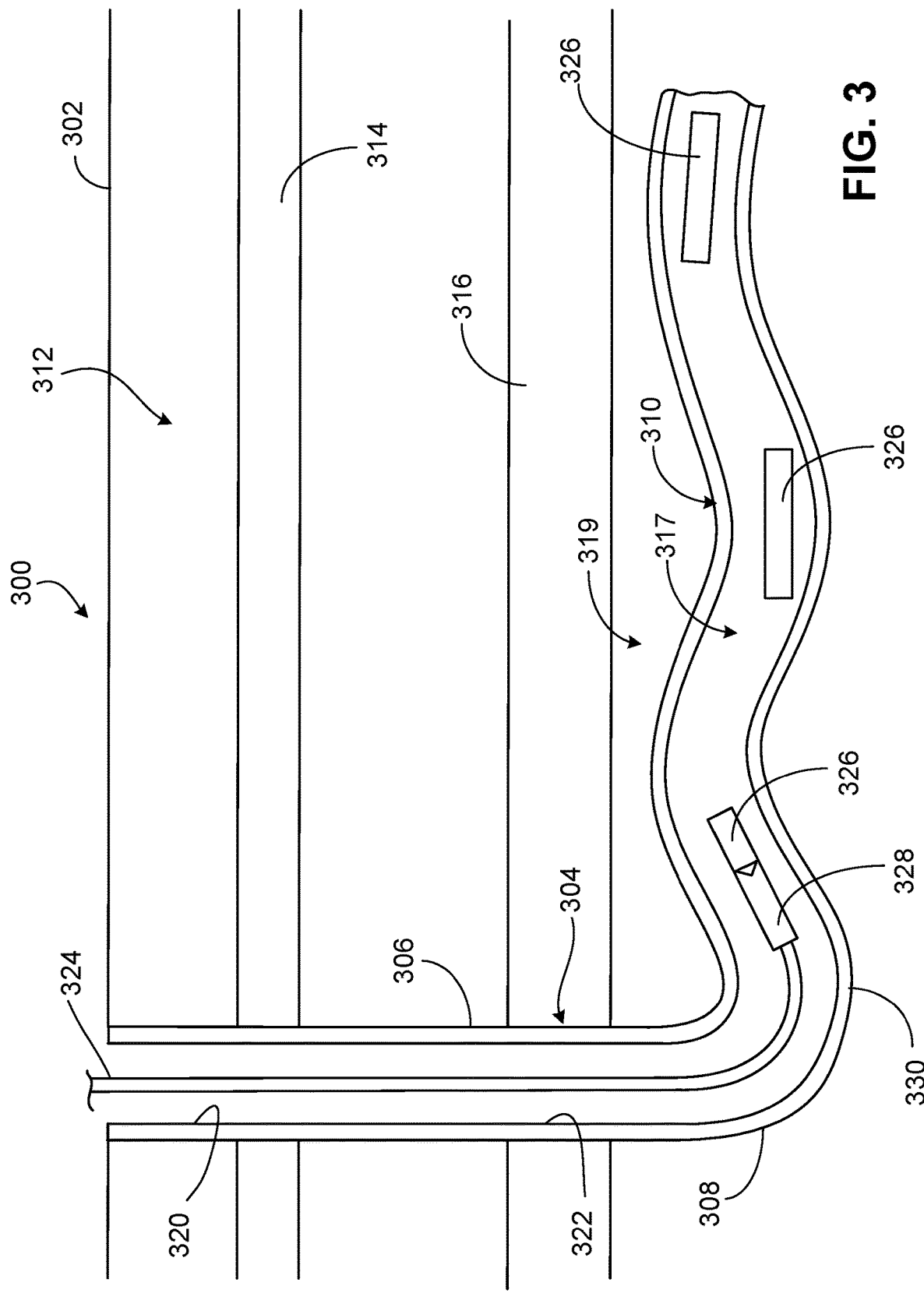

HAZARDOUS MATERIAL STORAGE REPOSITORY IN A SUBTERRANEAN FORMATION

CROSS-REFERENCE TO RELATED APPLICATIONS

This application is a continuation of, and claims priority under 35 U.S.C. § 120 to, U.S. patent application Ser. No. 15/997,819, filed on Jun. 5, 2018, and entitled "STORING HAZARDOUS MATERIAL IN A SUBTERRANEAN FORMATION," which in turn claims priority under 35 U.S.C. § 119 to U.S. Provisional Patent Application Ser. No. 62/515,050, filed on Jun. 5, 2017, and entitled "STORING HAZARDOUS MATERIAL IN A SUBTERRANEAN FORMATION." The entire contents of the previous applications are incorporated by reference herein.

TECHNICAL FIELD

This disclosure relates to storing hazardous material in a subterranean formation and, more particularly, storing spent nuclear fuel in a subterranean formation.

BACKGROUND

Hazardous waste is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even high-grade military waste) is considered to be one of the outstanding challenges of energy technology. Safe storage of the long-lived radioactive waste is a major impediment to the adoption of nuclear power in the United States and around the world. Conventional waste storage methods have emphasized the use of tunnels, and is exemplified by the design of the Yucca Mountain storage facility. Other techniques include boreholes, including vertical boreholes, drilled into crystalline basement rock. Other conventional techniques include forming a tunnel with boreholes emanating from the walls of the tunnel in shallow formations to allow human access.

SUMMARY

In a general implementation, a hazardous material storage repository includes a drillhole extending into the Earth and including an entry at least proximate a terranean surface, the drillhole including a substantially vertical drillhole portion, a transition drillhole portion coupled to the substantially vertical drillhole portion, and a hazardous material storage drillhole portion coupled to the transition drillhole portion, at least one of the transition drillhole portion or the hazardous material storage drillhole portion including an isolation drillhole portion that is directed vertically toward the terranean surface and away from an intersection between the substantially vertical drillhole portion and the transition drillhole portion; a storage canister positioned in the hazardous material storage drillhole portion, the storage canister sized to fit from the drillhole entry through the substantially vertical drillhole portion, the transition drillhole portion, and into the hazardous material storage drillhole portion of the drillhole, the storage canister including an inner cavity sized enclose hazardous material; and a seal positioned in the drillhole, the seal isolating the hazardous material storage drillhole portion of the drillhole from the entry of the drillhole.

In an aspect combinable with the general implementation, the isolation drillhole portion includes a vertically inclined drillhole portion that includes a proximate end coupled to the transition drillhole portion at a first depth and a distal end opposite the proximate end at a second depth shallower than the first depth.

In another aspect combinable with any of the previous aspects, the vertically inclined drillhole portion includes the hazardous material storage drillhole portion.

In another aspect combinable with any of the previous aspects, an inclination angle of the vertically inclined drillhole portion is determined based at least in part on a distance associated with a disturbed zone of a geologic formation that surrounds the vertically inclined drillhole portion and a length of a distance tangent to a lowest portion of the storage canister and the substantially vertical drillhole portion.

In another aspect combinable with any of the previous aspects, the distance associated with the disturbed zone of the geologic formation includes a distance between an outer circumference of the disturbed zone and a radial centerline of the vertically inclined drillhole portion.

In another aspect combinable with any of the previous aspects, the inclination angle is about 3 degrees.

In another aspect combinable with any of the previous aspects, the isolation drillhole portion includes a J-section drillhole portion coupled between the substantially vertical drillhole portion and the hazardous material storage drillhole portion.

In another aspect combinable with any of the previous aspects, the J-section drillhole portion includes the transition drillhole portion.

In another aspect combinable with any of the previous aspects, the hazardous material storage drillhole portion includes at least one of a substantially horizontal drillhole portion or a vertically inclined drillhole portion.

In another aspect combinable with any of the previous aspects, the isolation drillhole portion includes a vertically undulating drillhole portion coupled to the transition drillhole portion.

In another aspect combinable with any of the previous aspects, the transition drillhole portion includes a curved drillhole portion between the substantially vertical drillhole portion and the vertically undulating drillhole portion.

In another aspect combinable with any of the previous aspects, the hazardous material storage drillhole portion is located within or below a barrier layer that includes at least one of a shale formation layer, a salt formation layer, or other impermeable formation layer.

In another aspect combinable with any of the previous aspects, the hazardous material storage drillhole portion is vertically isolated, by the barrier layer, from a subterranean zone that includes mobile water.

In another aspect combinable with any of the previous aspects, the hazardous material storage drillhole portion is formed below the barrier layer and is vertically isolated from the subterranean zone that includes mobile water by the barrier layer.

In another aspect combinable with any of the previous aspects, the hazardous material storage drillhole portion is formed within the barrier layer, and is vertically isolated from the subterranean zone that includes mobile water by at least a portion of the barrier layer.

In another aspect combinable with any of the previous aspects, the barrier layer includes a permeability of less than about 0.01 millidarcys.

In another aspect combinable with any of the previous aspects, the barrier layer includes a brittleness of less than about 10 MPa, where brittleness includes a ratio of compressive stress of the barrier layer to tensile strength of the barrier layer.

In another aspect combinable with any of the previous aspects, the barrier layer includes a thickness proximate the hazardous material storage drillhole portion of at least about 100 feet.

In another aspect combinable with any of the previous aspects, the barrier layer includes a thickness proximate the hazardous material storage drillhole portion that inhibits diffusion of the hazardous material that escapes the storage canister through the barrier layer for an amount of time that is based on a half-life of the hazardous material.

In another aspect combinable with any of the previous aspects, the barrier layer includes about 20 to 30% weight by volume of clay or organic matter.

In another aspect combinable with any of the previous aspects, the barrier layer includes an impermeable layer.

In another aspect combinable with any of the previous aspects, the barrier layer includes a leakage barrier defined by a time constant for leakage of the hazardous material of 10,000 years or more.

In another aspect combinable with any of the previous aspects, the barrier layer includes a hydrocarbon or carbon dioxide bearing formation.

In another aspect combinable with any of the previous aspects, the hazardous material includes spent nuclear fuel.

Another aspect combinable with any of the previous aspects further includes at least one casing assembly that extends from at or proximate the terranean surface, through the drillhole, and into the hazardous material storage drillhole portion.

In another aspect combinable with any of the previous aspects, the storage canister includes a connecting portion configured to couple to at least one of a downhole tool string or another storage canister.

In another aspect combinable with any of the previous aspects, the isolation drillhole portion includes a spiral drillhole.

In another aspect combinable with any of the previous aspects, the isolation drillhole portion has a specified geometry independent of a stress state of a rock formation into which the isolation drillhole portion is formed.

In another general implementation, a method for storing hazardous material includes moving a storage canister through an entry of a drillhole that extends into a terranean surface, the entry at least proximate the terranean surface, the storage canister including an inner cavity sized enclose hazardous material; moving the storage canister through the drillhole that includes a substantially vertical drillhole portion, a transition drillhole portion coupled to the substantially vertical drillhole portion, and a hazardous material storage drillhole portion coupled to the transition drillhole portion, at least one of the transition drillhole portion or the hazardous material storage drillhole portion including an isolation drillhole portion that is directed vertically toward the terranean surface and away from an intersection between the substantially vertical drillhole portion and the transition drillhole portion; moving the storage canister into the hazardous material storage drillhole portion; and forming a seal in the drillhole that isolates the storage portion of the drillhole from the entry of the drillhole.

In an aspect combinable with the general implementation, the isolation drillhole portion includes a vertically inclined drillhole portion that includes a proximate end coupled to the transition drillhole portion at a first depth and a distal end opposite the proximate end at a second depth shallower than the first depth.

In another aspect combinable with any of the previous aspects, the vertically inclined drillhole portion includes the hazardous material storage drillhole portion.

In another aspect combinable with any of the previous aspects, an inclination angle of the vertically inclined drillhole portion is determined based at least in part on a distance associated with a disturbed zone of a geologic formation that surrounds the vertically inclined drillhole portion and a length of a distance tangent to a lowest portion of the storage canister and the substantially vertical drillhole portion.

In another aspect combinable with any of the previous aspects, the distance associated with the disturbed zone of the geologic formation includes a distance between an outer circumference of the disturbed zone and a radial centerline of the vertically inclined drillhole portion.

In another aspect combinable with any of the previous aspects, the inclination angle is about 3 degrees.

In another aspect combinable with any of the previous aspects, the isolation drillhole portion includes a J-section drillhole portion coupled between the substantially vertical drillhole portion and the hazardous material storage drillhole portion.

In another aspect combinable with any of the previous aspects, the J-section drillhole portion includes the transition drillhole portion.

In another aspect combinable with any of the previous aspects, the hazardous material storage drillhole portion includes at least one of a substantially horizontal drillhole portion or a vertically inclined drillhole portion.

In another aspect combinable with any of the previous aspects, the isolation drillhole portion includes a vertically undulating drillhole portion coupled to the transition drillhole portion.

In another aspect combinable with any of the previous aspects, the transition drillhole portion includes a curved drillhole portion between the substantially vertical drillhole portion and the vertically undulating drillhole portion.

In another aspect combinable with any of the previous aspects, the hazardous material storage drillhole portion is located within or below a barrier layer that includes at least one of a shale formation layer, a salt formation layer, or other impermeable formation layer.

In another aspect combinable with any of the previous aspects, the hazardous material storage drillhole portion is vertically isolated, by the barrier layer, from a subterranean zone that includes mobile water.

In another aspect combinable with any of the previous aspects, the hazardous material storage drillhole portion is formed below the barrier layer and is vertically isolated from the subterranean zone that includes mobile water by the barrier layer.

In another aspect combinable with any of the previous aspects, the hazardous material storage drillhole portion is formed within the barrier layer, and is vertically isolated from the subterranean zone that includes mobile water by at least a portion of the barrier layer.

In another aspect combinable with any of the previous aspects, the barrier layer includes a permeability of less than about 0.01 millidarcys.

In another aspect combinable with any of the previous aspects, the barrier layer includes a brittleness of less than about 10 MPa, where brittleness includes a ratio of compressive stress of the barrier layer to tensile strength of the barrier layer.

In another aspect combinable with any of the previous aspects, the barrier layer includes a thickness proximate the hazardous material storage drillhole portion of at least about 100 feet.

In another aspect combinable with any of the previous aspects, the barrier layer includes a thickness proximate the hazardous material storage drillhole portion that inhibits diffusion of the hazardous material that escapes the storage canister through the barrier layer for an amount of time that is based on a half-life of the hazardous material.

In another aspect combinable with any of the previous aspects, the barrier layer includes about 20 to 30% weight by volume of clay or organic matter.

In another aspect combinable with any of the previous aspects, the barrier layer includes an impermeable layer.

In another aspect combinable with any of the previous aspects, the barrier layer includes a leakage barrier defined by a time constant for leakage of the hazardous material of 10,000 years or more.

In another aspect combinable with any of the previous aspects, the barrier layer includes a hydrocarbon or carbon dioxide bearing formation.

In another aspect combinable with any of the previous aspects, the hazardous material includes spent nuclear fuel.

Another aspect combinable with any of the previous aspects further includes at least one casing assembly that extends from at or proximate the terranean surface, through the drillhole, and into the hazardous material storage drillhole portion.

In another aspect combinable with any of the previous aspects, the storage canister includes a connecting portion configured to couple to at least one of a downhole tool string or another storage canister.

Another aspect combinable with any of the previous aspects further includes prior to moving the storage canister through the entry of the drillhole that extends into the terranean surface, forming the drillhole from the terranean surface to a subterranean formation.

Another aspect combinable with any of the previous aspects further includes installing a casing in the drillhole that extends from at or proximate the terranean surface, through the drillhole, and into the hazardous material storage drillhole portion.

Another aspect combinable with any of the previous aspects further includes cementing the casing to the drillhole.

Another aspect combinable with any of the previous aspects further includes, subsequent to forming the drillhole, producing hydrocarbon fluid from the subterranean formation, through the drillhole, and to the terranean surface.

Another aspect combinable with any of the previous aspects further includes removing the seal from the drillhole; and retrieving the storage canister from the hazardous material storage drillhole portion to the terranean surface.

Another aspect combinable with any of the previous aspects further includes monitoring at least one variable associated with the storage canister from a sensor positioned proximate the hazardous material storage drillhole portion; and recording the monitored variable at the terranean surface.

In another aspect combinable with any of the previous aspects, the monitored variable includes at least one of radiation level, temperature, pressure, presence of oxygen, presence of water vapor, presence of liquid water, acidity, or seismic activity.

Another aspect combinable with any of the previous aspects further includes based on the monitored variable exceeding a threshold value removing the seal from the drillhole; and retrieving the storage canister from the hazardous material storage drillhole portion to the terranean surface.

In another general implementation, a method for storing hazardous material includes moving a storage canister through an entry of a drillhole that extends into a terranean surface, the entry at least proximate the terranean surface, the storage canister including an inner cavity sized enclose hazardous material; moving the storage canister through the drillhole that includes a substantially vertical drillhole portion, a transition drillhole portion coupled to the substantially vertical drillhole portion, and a hazardous material storage drillhole portion coupled to the transition drillhole portion, the hazardous material storage drillhole portion located below a self-healing geological formation, the hazardous material storage drillhole portion vertically isolated, by the self-healing geological formation, from a subterranean zone that includes mobile water; moving the storage canister into the hazardous material storage drillhole portion; and forming a seal in the drillhole that isolates the storage portion of the drillhole from the entry of the drillhole.

In an aspect combinable with the general implementation, the self-healing geologic formation includes at least one of shale, salt, clay, or dolomite.

In another general implementation, a hazardous material storage repository includes a drillhole extending into the Earth and including an entry at least proximate a terranean surface, the drillhole including a substantially vertical drillhole portion, a transition drillhole portion coupled to the substantially vertical drillhole portion, and a hazardous material storage drillhole portion coupled to the transition drillhole portion, the hazardous material storage drillhole portion located below a self-healing geological formation, the hazardous material storage drillhole portion vertically isolated, by the self-healing geological formation, from a subterranean zone that includes mobile water; a storage canister positioned in the hazardous material storage drillhole portion, the storage canister sized to fit from the drillhole entry through the substantially vertical drillhole portion, the transition drillhole portion, and into the hazardous material storage drillhole portion of the drillhole, the storage canister including an inner cavity sized enclose hazardous material; and a seal positioned in the drillhole, the seal isolating the hazardous material storage drillhole portion of the drillhole from the entry of the drillhole.

In an aspect combinable with the general implementation, the self-healing geologic formation includes at least one of shale, salt, clay, or dolomite.

Implementations of a hazardous material storage repository according to the present disclosure may include one or more of the following features. For example, a hazardous material storage repository according to the present disclosure may allow for multiple levels of containment of hazardous material within a storage repository located thousands of feet underground, decoupled from any nearby mobile water. A hazardous material storage repository according to the present disclosure may also use proven techniques (e.g., drilling) to create or form a storage area for the hazardous material, in a subterranean zone proven to have fluidly sealed hydrocarbons therein for millions of years. As another example, a hazardous material storage repository according to the present disclosure may provide long-term (e.g., thousands of years) storage for hazardous material (e.g., radioactive waste) in a shale formation that has geologic properties suitable for such storage, including low permeability, thickness, and ductility, among others. In addition, a greater volume of hazardous material may be stored at low cost—relative to conventional storage techniques—due in part to directional drilling techniques that facilitate long horizontal boreholes, often exceeding a mile in length. In addition, rock formations that have geologic properties suitable for such storage may be found in close proximity to sites at which hazardous material may be found or generated, thereby reducing dangers associated with transporting such hazardous material.

Implementations of a hazardous material storage repository according to the present disclosure may also include one or more of the following features. Large storage volumes, in turn, allow for the storage of hazardous materials to be emplaced without a need for complex prior treatment, such as concentration or transfer to different forms or canisters. As a further example, in the case of nuclear waste material from a reactor for instance, the waste can be kept in its original pellets, unmodified, or in its original fuel rods, or in its original fuel assemblies, which contain dozens of fuel rods. In another aspect, the hazardous material may be kept in an original holder but a cement or other material is injected into the holder to fill the gaps between the hazardous materials and the structure. For example, if the hazardous material is stored in fuel rods which are, in turn, stored in fuel assemblies, then the spaces between the rods (typically filled with water when inside a nuclear reactor) could be filled with cement or other material to provide yet an additional layer of isolation from the outside world. As yet a further example, secure and low cost storage of hazardous material is facilitated while still permitting retrieval of such material if circumstances deem it advantageous to recover the stored materials.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a schematic illustration of another example implementation of a hazardous material storage repository system during a deposit or retrieval operation according to the present disclosure.

DETAILED DESCRIPTION

Figure 1A:
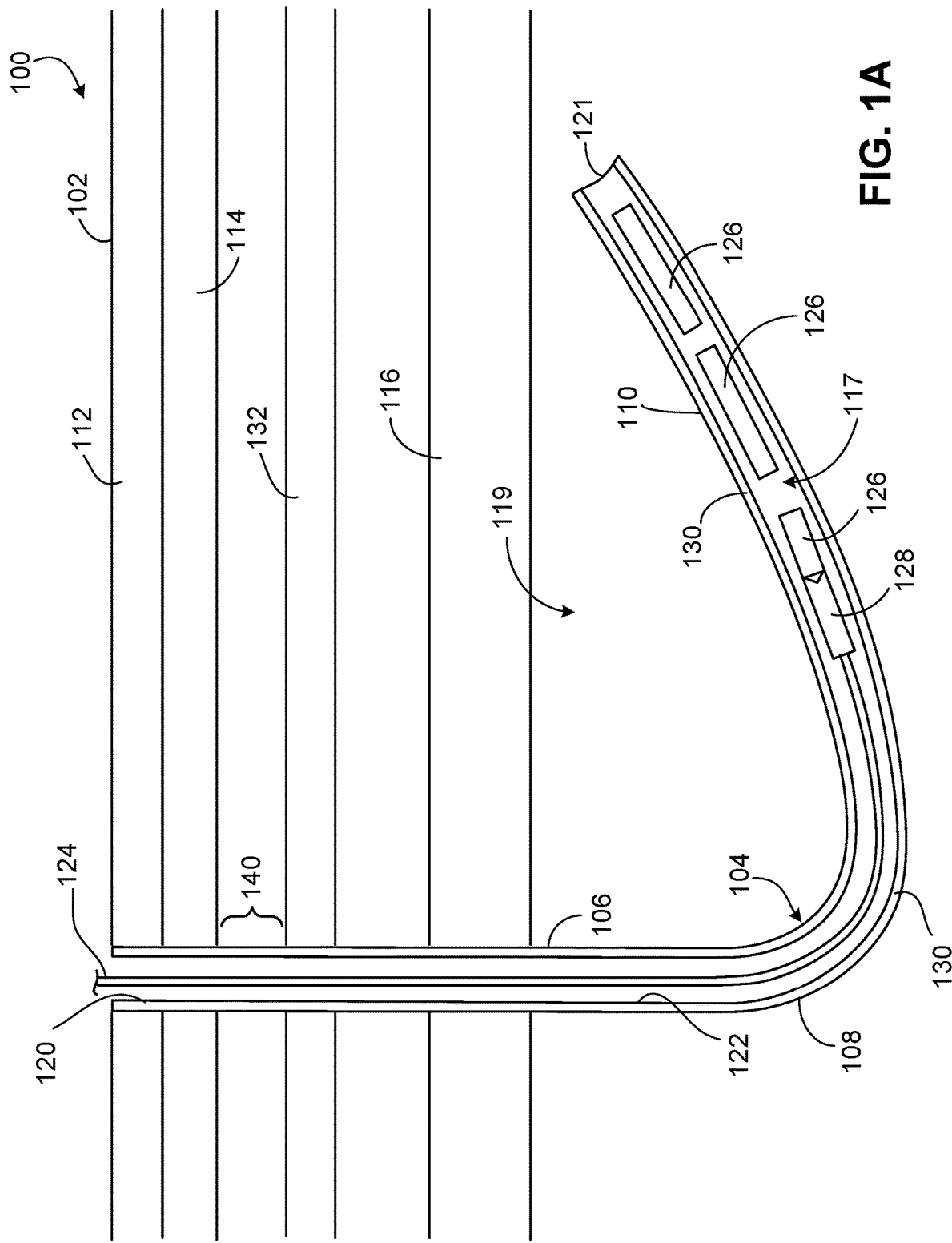
FIG. 1A is a schematic illustration of an example implementation of a hazardous material storage repository system during a deposit or retrieval operation according to the present disclosure.

FIG. 1A is a schematic illustration of example implementations of a hazardous material storage repository system, e.g., a subterranean location for the long-term (e.g., tens, hundreds, or thousands of years or more) but retrievable safe and secure storage of hazardous material, during a deposit or retrieval operation according to the present disclosure. For example, turning to FIG. 1A, this figure illustrates an example hazardous material storage repository system 100 during a deposit (or retrieval, as described below) process, e.g., during deployment of one or more canisters of hazardous material in a subterranean formation. As illustrated, the hazardous material storage repository system 100 includes a drillhole 104 formed (e.g., drilled or otherwise) from a terranean surface 102 and through multiple subterranean layers 112, 114, 116, and 132. Although the terranean surface 102 is illustrated as a land surface, terranean surface 102 may be a sub-sea or other underwater surface, such as a lake or an ocean floor or other surface under a body of water. Thus, the present disclosure contemplates that the drillhole 104 may be formed under a body of water from a drilling location on or proximate the body of water.

The illustrated drillhole 104 is a directional drillhole in this example of hazardous material storage repository system 100. For instance, the drillhole 104 includes a substantially vertical portion 106 coupled to a radiussed or curved portion 108, which in turn is coupled to an inclined portion 110. As used in the present disclosure, "substantially" in the context of a drillhole orientation, refers to drillholes that may not be exactly vertical (e.g., exactly perpendicular to the terranean surface 102) or exactly horizontal (e.g., exactly parallel to the terranean surface 102), or exactly inclined at a particular incline angle relative to the terranean surface 102. In other words, vertical drillholes often undulate offset from a true vertical direction, that they might be drilled at an angle that deviates from true vertical, and inclined drillholes often undulate offset from a true incline angle. Further, in some aspects, an inclined drillhole may not have or exhibit an exactly uniform incline (e.g., in degrees) over a length of the drillhole. Instead, the incline of the drillhole may vary over its length (e.g., by 1-5 degrees). As illustrated in this example, the three portions of the drillhole 104—the vertical portion 106, the radiussed portion 108, and the inclined portion 110—form a continuous drillhole 104 that extends into the Earth.

The illustrated drillhole 104, in this example, has a surface casing 120 positioned and set around the drillhole 104 from the terranean surface 102 into a particular depth in the Earth. For example, the surface casing 120 may be a relatively large-diameter tubular member (or string of members) set (e.g., cemented) around the drillhole 104 in a shallow formation. As used herein, "tubular" may refer to a member that has a circular cross-section, elliptical cross-section, or other shaped cross-section. For example, in this implementation of the hazardous material storage repository system 100, the surface casing 120 extends from the terranean surface through a surface layer 112. The surface layer 112, in this example, is a geologic layer comprised of one or more layered rock formations. In some aspects, the surface layer 112 in this example may or may not include freshwater aquifers, salt water or brine sources, or other sources of mobile water (e.g., water that moves through a geologic formation). In some aspects, the surface casing 120 may isolate the drillhole 104 from such mobile water, and may also provide a hanging location for other casing strings to be installed in the drillhole 104. Further, although not shown, a conductor casing may be set above the surface casing 120 (e.g., between the surface casing 120 and the surface 102 and within the surface layer 112) to prevent drilling fluids from escaping into the surface layer 112.

As illustrated, a production casing 122 is positioned and set within the drillhole 104 downhole of the surface casing 120. Although termed a "production" casing, in this example, the casing 122 may or may not have been subject to hydrocarbon production operations. Thus, the casing 122 refers to and includes any form of tubular member that is set (e.g., cemented) in the drillhole 104 downhole of the surface casing 120. In some examples of the hazardous material storage repository system 100, the production casing 122 may begin at an end of the radiussed portion 108 and extend throughout the inclined portion 110. The casing 122 could also extend into the radiussed portion 108 and into the vertical portion 106.

As shown, cement 130 is positioned (e.g., pumped) around the casings 120 and 122 in an annulus between the casings 120 and 122 and the drillhole 104. The cement 130, for example, may secure the casings 120 and 122 (and any other casings or liners of the drillhole 104) through the subterranean layers under the terranean surface 102. In some aspects, the cement 130 may be installed along the entire length of the casings (e.g., casings 120 and 122 and any other casings), or the cement 130 could be used along certain portions of the casings if adequate for a particular drillhole 102. The cement 130 can also provide an additional layer of confinement for the hazardous material in canisters 126.

The drillhole 104 and associated casings 120 and 122 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 120 may extend down to about 2500 feet TVD, with a diameter of between about 22 in. and 48 in. An intermediate casing (not shown) between the surface casing 120 and production casing 122 may extend down to about 8000 feet TVD, with a diameter of between about 16 in. and 36 in. The production casing 122 may extend inclinedly (e.g., to case the inclined portion 110) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (112, 114, 116, and 132), particular drilling techniques, as well as a size, shape, or design of a hazardous material canister 126 that contains hazardous material to be deposited in the hazardous material storage repository system 100. In some alternative examples, the production casing 122 (or other casing in the drillhole 104) could be circular in cross-section, elliptical in cross-section, or some other shape.

As illustrated, the vertical portion 106 of the drillhole 104 extends through subterranean layers 112, 114, 116, and 132, and, in this example, lands in a subterranean layer 119. As discussed above, the surface layer 112 may or may not include mobile water. Subterranean layer 114, which is below the surface layer 112, in this example, is a mobile water layer 114. For instance, mobile water layer 114 may include one or more sources of mobile water, such as freshwater aquifers, salt water or brine, or other source of mobile water. In this example of hazardous material storage repository system 100, mobile water may be water that moves through a subterranean layer based on a pressure differential across all or a part of the subterranean layer. For example, the mobile water layer 114 may be a permeable geologic formation in which water freely moves (e.g., due to pressure differences or otherwise) within the layer 114. In some aspects, the mobile water layer 114 may be a primary source of human-consumable water in a particular geographic area. Examples of rock formations of which the mobile water layer 114 may be composed include porous sandstones and limestones, among other formations.

Other illustrated layers, such as the impermeable layer 116 and the storage layer 119, may include immobile water. Immobile water, in some aspects, is water (e.g., fresh, salt, brine), that is not fit for human or animal consumption, or both. Immobile water, in some aspects, may be water that, by its motion through the layers 116 or 119 (or both), cannot reach the mobile water layer 114, terranean surface 102, or both, within 10,000 years or more (such as to 1,000,000 years).

Below the mobile water layer 114, in this example implementation of hazardous material storage repository system 100, is an impermeable layer 116. The impermeable layer 116, in this example, may not allow mobile water to pass through. Thus, relative to the mobile water layer 114, the impermeable layer 116 may have low permeability, e.g., on the order of nanodarcy permeability. Additionally, in this example, the impermeable layer 116 may be a relatively non-ductile (i.e., brittle) geologic formation. One measure of non-ductility is brittleness, which is the ratio of compressive stress to tensile strength. In some examples, the brittleness of the impermeable layer 116 may be between about 20 MPa and 40 MPa.

As shown in this example, the impermeable layer 116 is shallower (e.g., closer to the terranean surface 102) than the storage layer 119. In this example rock formations of which the impermeable layer 116 may be composed include, for example, certain kinds of sandstone, mudstone, clay, and slate that exhibit permeability and brittleness properties as described above. In alternative examples, the impermeable layer 116 may be deeper (e.g., further from the terranean surface 102) than the storage layer 119. In such alternative examples, the impermeable layer 116 may be composed of an igneous rock, such as granite.

Below the impermeable layer 116 is the storage layer 119. The storage layer 119, in this example, may be chosen as the landing for the inclined portion 110, which stores the hazardous material, for several reasons. Relative to the impermeable layer 116 or other layers, the storage layer 119 may be thick, e.g., between about 100 and 200 feet of total vertical thickness. Thickness of the storage layer 119 may allow for easier landing and directional drilling, thereby allowing the inclined portion 110 to be readily emplaced within the storage layer 119 during constructions (e.g., drilling). If formed through an approximate horizontal center of the storage layer 119, the inclined portion 110 may be surrounded by about 50 to 100 feet of the geologic formation that comprises the storage layer 119. Further, the storage layer 119 may also have only immobile water, e.g., due to a very low permeability of the layer 119 (e.g., on the order of milli- or nanodarcys). In addition, the storage layer 119 may have sufficient ductility, such that a brittleness of the rock formation that comprises the layer 119 is between about 3 MPa and 10 MPa. Examples of rock formations of which the storage layer 119 may be composed include: shale and anhydrite. Further, in some aspects, hazardous material may be stored below the storage layer, even in a permeable formation such as sandstone or limestone, if the storage layer is of sufficient geologic properties to isolate the permeable layer from the mobile water layer 114.

In some examples implementations of the hazardous material storage repository system 100, the storage layer 119 (and/or the impermeable layer 116) is composed of shale. Shale, in some examples, may have properties that fit within those described above for the storage layer 119. For example, shale formations may be suitable for a long-term confinement of hazardous material (e.g., in the hazardous material canisters 126), and for their isolation from mobile water layer 114 (e.g., aquifers) and the terranean surface 102. Shale formations may be found relatively deep in the Earth, typically 3000 feet or greater, and placed in isolation below any fresh water aquifers. Other formations may include salt or other impermeable formation layer.

Shale formations (or salt or other impermeable formation layers), for instance, may include geologic properties that enhance the long-term (e.g., thousands of years) isolation of material. Such properties, for instance, have been illustrated through the long term storage (e.g., tens of millions of years) of hydrocarbon fluids (e.g., gas, liquid, mixed phase fluid) without escape of substantial fractions of such fluids into surrounding layers (e.g., mobile water layer 114). Indeed, shale has been shown to hold natural gas for millions of years or more, giving it a proven capability for long-term storage of hazardous material. Example shale formations (e.g., Marcellus, Eagle Ford, Barnett, and otherwise) has stratification that contains many redundant sealing layers that have been effective in preventing movement of water, oil, and gas for millions of years, lacks mobile water, and can be expected (e.g., based on geological considerations) to seal hazardous material (e.g., fluids or solids) for thousands of years after deposit.

In some aspects, the formation of the storage layer 119 and/or the impermeable layer 116 may form a leakage barrier, or barrier layer to fluid leakage that may be determined, at least in part, by the evidence of the storage capacity of the layer for hydrocarbons or other fluids (e.g., carbon dioxide) for hundreds of years, thousands of years, tens of thousands of years, hundreds of thousands of years, or even millions of years. For example, the barrier layer of the storage layer 119 and/or impermeable layer 116 may be defined by a time constant for leakage of the hazardous material more than 10,000 years (such as between about 10,000 years and 1,000,000 years) based on such evidence of hydrocarbon or other fluid storage.

Shale (or salt or other impermeable layer) formations may also be at a suitable depth, e.g., between 3000 and 12,000 feet TVD. Such depths are typically below ground water aquifer (e.g., surface layer 112 and/or mobile water layer 114). Further, the presence of soluble elements in shale, including salt, and the absence of these same elements in aquifer layers, demonstrates a fluid isolation between shale and the aquifer layers.

Another particular quality of shale that may advantageously lend itself to hazardous material storage is its clay content, which, in some aspects, provides a measure of ductility greater than that found in other, impermeable rock formations (e.g., impermeable layer 116). For example, shale may be stratified, made up of thinly alternating layers of clays (e.g., between about 20-30% clay by volume) and other minerals. Such a composition may make shale less brittle and, thus less susceptible to fracturing (e.g., naturally or otherwise) as compared to rock formations in the impermeable layer (e.g., dolomite or otherwise). For example, rock formations in the impermeable layer 116 may have suitable permeability for the long term storage of hazardous material, but are too brittle and commonly are fractured. Thus, such formations may not have sufficient sealing qualities (as evidenced through their geologic properties) for the long term storage of hazardous material.

The present disclosure contemplates that there may be many other layers between or among the illustrated subterranean layers 112, 114, 116, and 119. For example, there may be repeating patterns (e.g., vertically), of one or more of the mobile water layer 114, impermeable layer 116, and storage layer 119. Further, in some instances, the storage layer 119 may be directly adjacent (e.g., vertically) the mobile water layer 114, i.e., without an intervening impermeable layer 116. In some examples, all or portions of the radiussed drillhole 108 and the inclined drillhole 110 may be formed below the storage layer 119, such that the storage layer 119 (e.g., shale or other geologic formation with characteristics as described herein) is vertically positioned between the inclined drillhole 110 and the mobile water layer 114.

Further, in this example implementation, a self-healing layer 132 may be found below the terranean surface 102 and between, for example, the surface 102 and one or both of the impermeable layer 116 and the storage layer 119. In some aspects, the self-healing layer 132 may comprise a geologic formation that can stop or impede a flow of hazardous material (whether in liquid, solid, or gaseous form) from a storage portion of the drillhole 104 to or toward the terranean surface 102. For example, during formation of the drillhole 104 (e.g., drilling), all are portions of the geologic formations of the layers 112, 114, 116, and 119, may be damaged (as illustrated by a damaged zone 140), thereby affecting or changing their geologic characteristics (e.g., permeability). Indeed, although damaged zone 140 is illustrated between layers 114 and 132 for simplicity sake, the damaged zone 140 may surround an entire length (vertical, curved, and inclined portions) of the drillhole 104 a particular distance into the layers 112, 114, 116, 119, 132, and otherwise.

In certain aspects, the location of the drillhole 104 may be selected so as to be formed through the self-healing layer 132. For example, as shown, the drillhole 104 may be formed such that at least a portion of the vertical portion 106 of the drillhole 104 is formed to pass through the self-healing layer 132. In some aspects, the self-healing layer 132 comprises a geologic formation that that does not sustain cracks for extended time durations even after being drilled therethrough. Examples of the geologic formation in the self-healing layer 132 include clay or dolomite. Cracks in such rock formations tend to heal, that is, they disappear rapidly with time due to the relative ductility of the material, and the enormous pressures that occur underground from the weight of the overlying rock on the formation in the self-healing layer. In addition to providing a "healing mechanism" for cracks that occur due to the formation of the drillhole 104 (e.g., drilling or otherwise), the self-healing layer 132 may also provide a barrier to natural faults and other cracks that otherwise could provide a pathway for hazardous material leakage (e.g., fluid or solid) from the storage region (e.g., in the inclined portion 110) to the terranean surface 102, the mobile water layer 114, or both.

As shown in this example, the inclined portion 110 of the drillhole 104 includes a storage area 117 in a distal part of the portion 110 into which hazardous material may be retrievably placed for long-term storage. For example, as shown, a work string 124 (e.g., tubing, coiled tubing, wireline, or otherwise) may be extended into the cased drillhole 104 to place one or more (three shown but there may be more or less) hazardous material canisters 126 into long term, but in some aspects, retrievable, storage in the portion 110. For example, in the implementation shown in FIG. 1A, the work string 124 may include a downhole tool 128 that couples to the canister 126, and with each trip into the drillhole 104, the downhole tool 128 may deposit a particular hazardous material canister 126 in the inclined portion 110.

The downhole tool 128 may couple to the canister 126 by, in some aspects, a threaded connection or other type of connection, such as a latched connection. In alternative aspects, the downhole tool 128 may couple to the canister 126 with an interlocking latch, such that rotation (or linear movement or electric or hydraulic switches) of the downhole tool 128 may latch to (or unlatch from) the canister 126. In alternative aspects, the downhole tool 124 may include one or more magnets (e.g., rare Earth magnets, electromagnets, a combination thereof, or otherwise) which attractingly couple to the canister 126. In some examples, the canister 126 may also include one or more magnets (e.g., rare Earth magnets, electromagnets, a combination thereof, or otherwise) of an opposite polarity as the magnets on the downhole tool 124. In some examples, the canister 126 may be made from or include a ferrous or other material attractable to the magnets of the downhole tool 124.

As another example, each canister 126 may be positioned within the drillhole 104 by a drillhole tractor (e.g., on a wireline or otherwise), which may push or pull the canister into the inclined portion 110 through motorized (e.g., electric) motion. As yet another example, each canister 126 may include or be mounted to rollers (e.g., wheels), so that the downhole tool 124 may push the canister 126 into the cased drillhole 104.

In some example implementations, the canister 126, one or more of the drillhole casings 120 and 122, or both, may be coated with a friction-reducing coating prior to the deposit operation. For example, by applying a coating (e.g., petroleum-based product, resin, ceramic, or otherwise) to the canister 126 and/or drillhole casings, the canister 126 may be more easily moved through the cased drillhole 104 into the inclined portion 110. In some aspects, only a portion of the drillhole casings may be coated. For example, in some aspects, the substantially vertical portion 106 may not be coated, but the radiussed portion 108 or the inclined portion 110, or both, may be coated to facilitate easier deposit and retrieval of the canister 126.

FIG. 1A also illustrates an example of a retrieval operation of hazardous material in the inclined portion 110 of the drillhole 104. A retrieval operation may be the opposite of a deposit operation, such that the downhole tool 124 (e.g., a fishing tool) may be run into the drillhole 104, coupled to the last-deposited canister 126 (e.g., threadingly, latched, by magnet, or otherwise), and pull the canister 126 to the terranean surface 102. Multiple retrieval trips may be made by the downhole tool 124 in order to retrieve multiple canisters from the inclined portion 110 of the drillhole 104.

Each canister 126 may enclose hazardous material. Such hazardous material, in some examples, may be biological or chemical waste or other biological or chemical hazardous material. In some examples, the hazardous material may include nuclear material, such as spent nuclear fuel recovered from a nuclear reactor (e.g., commercial power or test reactor) or military nuclear material. For example, a gigawatt nuclear plant may produce 30 tons of spent nuclear fuel per year. The density of that fuel is typically close to 10 (10 $gm/cm^3$=10 kg/liter), so that the volume for a year of nuclear waste is about 3 $m^3$. Spent nuclear fuel, in the form of nuclear fuel pellets, may be taken from the reactor and not modified. Nuclear fuel pellet are solid, although they can contain and emit a variety of radioactive gases including tritium (13 year half-life), krypton-85 (10.8 year half-life), and carbon dioxide containing C-14 (5730 year half-life).

In some aspects, the storage layer 119 should be able to contain any radioactive output (e.g., gases) within the layer 119, even if such output escapes the canisters 126. For example, the storage layer 119 may be selected based on diffusion times of radioactive output through the layer 119. For example, a minimum diffusion time of radioactive output escaping the storage layer 119 may be set at, for example, fifty times a half-life for any particular component of the nuclear fuel pellets. Fifty half-lives as a minimum diffusion time would reduce an amount of radioactive output by a factor of $1 \times 10^{-15}$. As another example, setting a minimum diffusion time to thirty half-lives would reduce an amount of radioactive output by a factor of one billion.

For example, plutonium-239 is often considered a dangerous waste product in spent nuclear fuel because of its long half-life of 24,100 years. For this isotope, 50 half-lives would be 1.2 million years. Plutonium-239 has low solubility in water, is not volatile, and as a solid. its diffusion time is exceedingly small (e.g., many millions of years) through a matrix of the rock formation that comprises the illustrated storage layer 119 (e.g., shale or other formation). The storage layer 119, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

As further shown in FIG. 1A, the storage canisters 126 may be positioned for long term storage in the inclined portion 110, which, as shown, is tilted upward at a small angle (e.g., 2-5 degrees) as it gets further away from the vertical portion 106 of the drillhole 104. As illustrated, the inclined portion 110 tilts upward toward the terranean surface 102. In some aspects, for example when there is radioactive hazardous material stored in the canisters 126, the inclination of the drillhole portion 110 may provide a further degree of safety and containment to prevent or impede the material, even if leaked from the canister 126, from reaching, e.g., the mobile water layer 114, the vertical portion 106 of the drillhole 104, the terranean surface 102, or a combination thereof. For example, radionuclides of concern in the hazardous material tend to be relatively buoyant or heavy (as compared to brine or other fluids that might fill the drillhole). Buoyant radionuclides may be the greatest concern for leakage, since heavy elements and molecules tend to sink, and would not diffuse upward towards the terranean surface 102. Krypton gas, and particularly $^{14}CO_2$ (where $^{14}C$ refers to radiocarbon, also called C-14, which is an isotope of carbon with a half-life of 5730 years), is a buoyant radioactive element that is heavier than air (as are most gases) but much lighter than water. Thus, should $^{14}CO_2$ be introduced into a water bath, such gas would tend to float upward towards the terranean surface 102. Iodine, on the other hand, is denser than water, and would tend to diffuse downward if introduced into a water bath.

By including the inclined portion 110 of the drillhole 104, any such diffusion of radioactive material (e.g., even if leaked from a canister 126 and in the presence of water or other liquid in the drillhole 104 or otherwise) would be directed angularly upward toward a distal end 121 of the inclined portion 110 and away from the radiussed portion 108 (and the vertical portion 106) of the drillhole 104. Thus, leaked hazardous material, even in a diffusible gas form, would not be offered a path (e.g., directly) to the terranean surface 102 (or the mobile water layer 114) through the vertical portion 106 of the drillhole 110. For instance, the leaked hazardous material (especially in gaseous form) would be directed and gathered at the distal end 121 of the drillhole portion 110.

Alternative methods of depositing the canisters 126 into the inclined drillhole portion 110 may also be implemented. For instance, a fluid (e.g., liquid or gas) may be circulated through the drillhole 104 to fluidly push the canisters 126 into the inclined drillhole portion 110. In some example, each canister 126 may be fluidly pushed separately. In alternative aspects, two or more canisters 126 may be fluidly pushed, simultaneously, through the drillhole 104 for deposit into the inclined portion 110. The fluid can be, in some cases, water. Other examples include a drilling mud or drilling foam. In some examples, a gas may be used to push the canisters 126 into the drillhole, such as air, argon, or nitrogen.

In some aspects, the choice of fluid may depend at least in part on a viscosity of the fluid. For example, a fluid may be chosen with enough viscosity to impede the drop of the canister 126 into the substantially vertical portion 106. This resistance or impedance may provide a safety factor against a sudden drop of the canister 126. The fluid may also provide lubrication to reduce a sliding friction between the canister 126 and the casings 120 and 122. The canister 126 can be conveyed within a casing filled with a liquid of controlled viscosity, density, and lubricant qualities. The fluid-filled annulus between the inner diameter of the casings 120 and 122 and the outer diameter of the conveyed canister 126 represents an opening designed to dampen any high rate of canister motion, providing automatic passive protection in an unlikely decoupling of the conveyed canister 126.

In some aspects, other techniques may be employed to facilitate deposit of the canister 126 into the inclined portion 110. For example, one or more of the installed casings (e.g., casings 120 and 122) may have rails to guide the storage canister 126 into the drillhole 102 while reducing friction between the casings and the canister 126. The storage canister 126 and the casings (or the rails) may be made of materials that slide easily against one another. The casings may have a surface that is easily lubricated, or one that is self-lubricating when subjected to the weight of the storage canister 126.

The fluid may also be used for retrieval of the canister 126. For example, in an example retrieval operation, a volume within the casings 120 and 122 may be filled with a compressed gas (e.g., air, nitrogen, argon, or otherwise). As the pressure increases at an end of the inclined portion 110, the canisters 126 may be pushed toward the radiussed portion 108, and subsequently through the substantially vertical portion 106 to the terranean surface.

In some aspects, the drillhole 104 may be formed for the primary purpose of long-term storage of hazardous materials. In alternative aspects, the drillhole 104 may have been previously formed for the primary purpose of hydrocarbon production (e.g., oil, gas). For example, storage layer 119 may be a hydrocarbon bearing formation from which hydrocarbons were produced into the drillhole 104 and to the terranean surface 102. In some aspects, the storage layer 119 may have been hydraulically fractured prior to hydrocarbon production. Further in some aspects, the production casing 122 may have been perforated prior to hydraulic fracturing. In such aspects, the production casing 122 may be patched (e.g., cemented) to repair any holes made from the perforating process prior to a deposit operation of hazardous material. In addition, any cracks or openings in the cement between the casing and the drillhole can also be filled at that time.

For example, in the case of spent nuclear fuel as a hazardous material, the drillhole may be formed at a particular location, e.g., near a nuclear power plant, as a new drillhole provided that the location also includes an appropriate storage layer 119, such as a shale formation. Alternatively, an existing well that has already produced shale gas, or one that was abandoned as "dry," (e.g., with sufficiently low organics that the gas in place is too low for commercial development), may be selected as the drillhole 104. In some aspects, prior hydraulic fracturing of the storage layer 119 through the drillhole 104 may make little difference in the hazardous material storage capability of the drillhole 104. But such a prior activity may also confirm the ability of the storage layer 119 to store gases and other fluids for millions of years. If, therefore, the hazardous material or output of the hazardous material (e.g., radioactive gasses or otherwise) were to escape from the canister 126 and enter the fractured formation of the storage layer 119, such fractures may allow that material to spread relatively rapidly over a distance comparable in size to that of the fractures. In some aspects, the drillhole 102 may have been drilled for a production of hydrocarbons, but production of such hydrocarbons had failed, e.g., because the storage layer 119 comprised a rock formation (e.g., shale or otherwise) that was too ductile and difficult to fracture for production, but was advantageously ductile for the long-term storage of hazardous material.

Figure 1B:
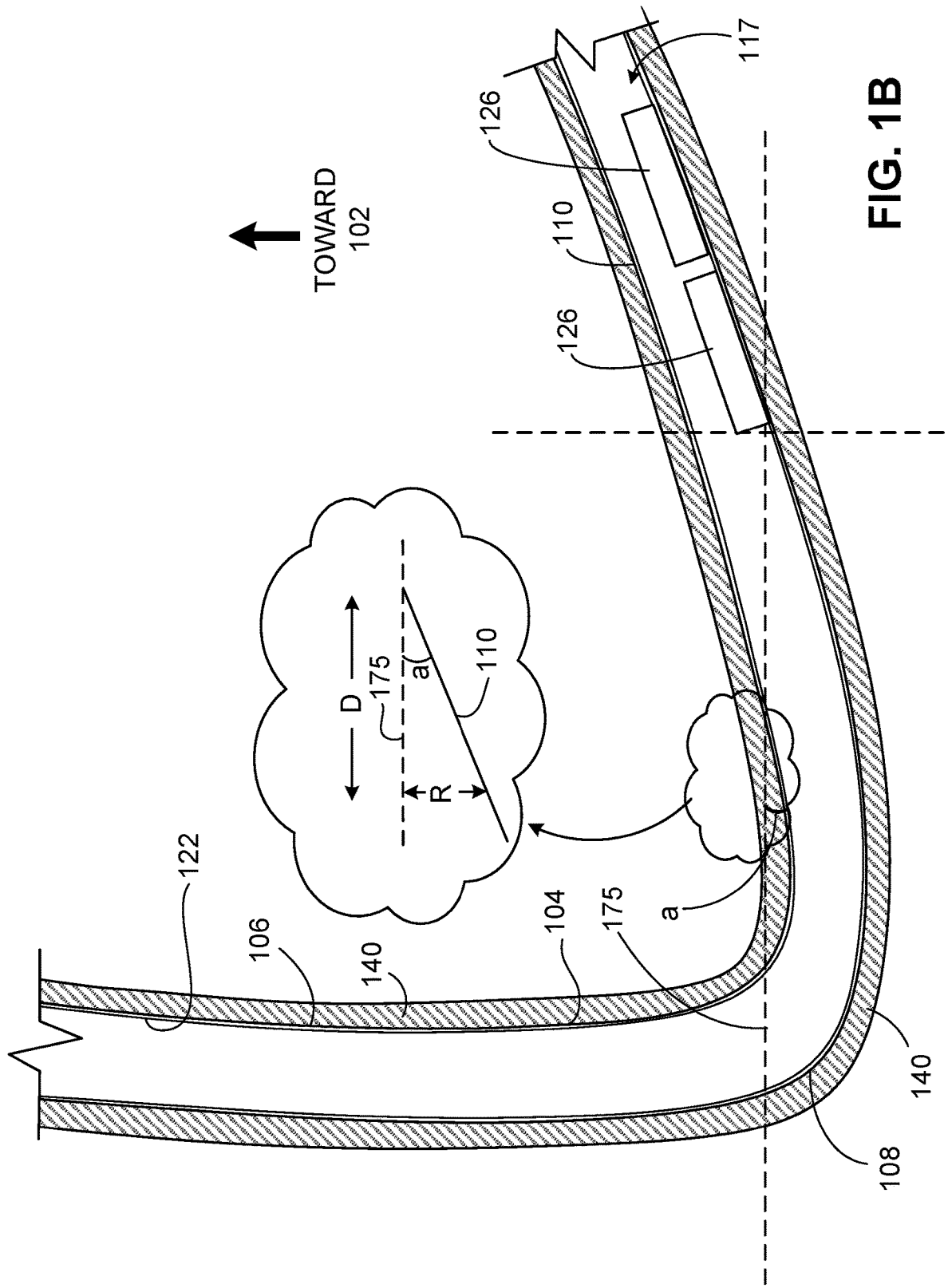
FIG. 1B is a schematic illustration of a portion of the example implementation of the hazardous material storage repository system of FIG. 1A that shows an example determination of a minimum angle of an inclined portion of the hazardous material storage repository system.

FIG. 1B is a schematic illustration of a portion of the example implementation of the hazardous material storage repository system 100 that shows an example determination of a minimum angle of the inclined portion 110 of the hazardous material storage repository system 100. For example, as shown in system 100, the inclined portion 110 provides that any path that leaking hazardous material (e.g., from one or more of the canister 126) takes to the terranean surface 102 through the drillhole 104 includes at least one downward component. In this case, the inclined portion 110 is the downward component. In other example implementations described later, such as systems 200 and 300, other portions (e.g., a J-section portion or undulating portion) may include at least one downward component. Such paths, as shown in this example, dip below a horizontal escape limit line 175 that intersects a canister 126 that is closest (when positioned in the storage area 117) to the vertical portion 106 of the drillhole 104. and therefore must include a downward component.

In some aspects, an angle, a, of the inclined portion 110 of the drillhole 104 may be determined (and thereby guide the formation of the drillhole 104) according to a radius, R, of the damaged zone 140 of the drillhole 104 and a distance, D, from the canister 126 that is closest to the vertical portion 106 of the drillhole 104. As shown in the callout bubble in FIG. 1B, with knowledge of the distances R and D (or at least estimates), then the angle, a, can be computed according to the arctangent of R/D. In an example implementation, R may be about 1 meter while D may be about 20 meters.

The angle, a, therefore, as the arctangent of R/D is about 3°. This is just one example of the determination of the angle, a, of a downward component (e.g., the inclined portion 110) of the drillhole 104 to ensure that such a downward component dips below the horizontal escape limit line 175.

Figure 2:
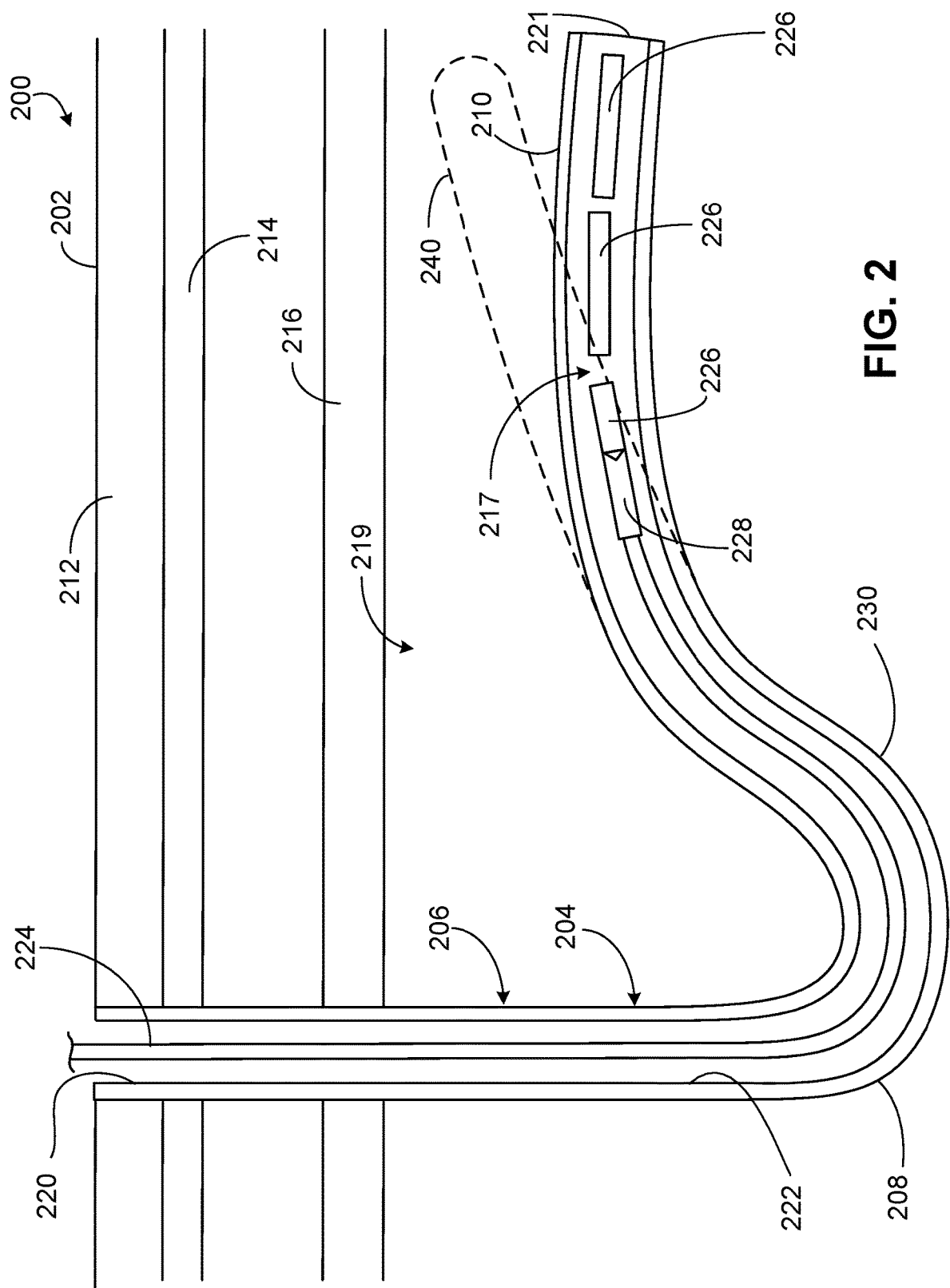
FIG. 2 is a schematic illustration of another example implementation of a hazardous material storage repository system during a deposit or retrieval operation according to the present disclosure.

FIG. 2 is a schematic illustration of example implementations of another hazardous material storage repository system, e.g., a subterranean location for the long-term (e.g., tens, hundreds, or thousands of years or more) but retrievable safe and secure storage of hazardous material, during a deposit or retrieval operation according to the present disclosure. For example, turning to FIG. 2, this figure illustrates an example hazardous material storage repository system 200 during a deposit (or retrieval, as described below) process, e.g., during deployment of one or more canisters of hazardous material in a subterranean formation. As illustrated, the hazardous material storage repository system 200 includes a drillhole 204 formed (e.g., drilled or otherwise) from a terranean surface 202 and through multiple subterranean layers 212, 214, and 216. Although the terranean surface 202 is illustrated as a land surface, terranean surface 202 may be a sub-sea or other underwater surface, such as a lake or an ocean floor or other surface under a body of water. Thus, the present disclosure contemplates that the drillhole 204 may be formed under a body of water from a drilling location on or proximate the body of water.

The illustrated drillhole 204 is a directional drillhole in this example of hazardous material storage repository system 200. For instance, the drillhole 204 includes a substantially vertical portion 206 coupled to a J-section portion 208, which in turn is coupled to a substantially horizontal portion 210. The J-section portion 208 as shown, has a shape that resembles the bottom portion of the letter "J" and may be shaped similar to a p-trap device used in a plumbing system that is used to prevent gasses from migrating from one side of the bend to the other side of the bend. As used in the present disclosure, "substantially" in the context of a drillhole orientation, refers to drillholes that may not be exactly vertical (e.g., exactly perpendicular to the terranean surface 202) or exactly horizontal (e.g., exactly parallel to the terranean surface 202), or exactly inclined at a particular incline angle relative to the terranean surface 202. In other words, vertical drillholes often undulate offset from a true vertical direction, that they might be drilled at an angle that deviates from true vertical, and horizontal drillholes often undulate offset from exactly horizontal.

As illustrated in this example, the three portions of the drillhole 204—the vertical portion 206, the J-section portion 208, and the substantially horizontal portion 210—form a continuous drillhole 204 that extends into the Earth. As also shown in dashed line in FIG. 2, the J-section portion 208 may be coupled to an inclined portion 240 rather than (or in addition to) the substantially horizontal portion 210 of the drillhole 204.

The illustrated drillhole 204, in this example, has a surface casing 220 positioned and set around the drillhole 204 from the terranean surface 202 into a particular depth in the Earth. For example, the surface casing 220 may be a relatively large-diameter tubular member (or string of members) set (e.g., cemented) around the drillhole 204 in a shallow formation. As used herein, "tubular" may refer to a member that has a circular cross-section, elliptical cross-section, or other shaped cross-section. For example, in this implementation of the hazardous material storage repository system 200, the surface casing 220 extends from the terranean surface through a surface layer 212. The surface layer 212, in this example, is a geologic layer comprised of one or more layered rock formations. In some aspects, the surface layer 212 in this example may or may not include freshwater aquifers, salt water or brine sources, or other sources of mobile water (e.g., water that moves through a geologic formation). In some aspects, the surface casing 220 may isolate the drillhole 204 from such mobile water, and may also provide a hanging location for other casing strings to be installed in the drillhole 204. Further, although not shown, a conductor casing may be set above the surface casing 220 (e.g., between the surface casing 220 and the surface 202 and within the surface layer 212) to prevent drilling fluids from escaping into the surface layer 212.

As illustrated, a production casing 222 is positioned and set within the drillhole 204 downhole of the surface casing 220. Although termed a "production" casing, in this example, the casing 222 may or may not have been subject to hydrocarbon production operations. Thus, the casing 222 refers to and includes any form of tubular member that is set (e.g., cemented) in the drillhole 204 downhole of the surface casing 220. In some examples of the hazardous material storage repository system 200, the production casing 222 may begin at an end of the J-section portion 208 and extend throughout the substantially horizontal portion 210. The casing 222 could also extend into the J-section portion 208 and into the vertical portion 206.

As shown, cement 230 is positioned (e.g., pumped) around the casings 220 and 222 in an annulus between the casings 220 and 222 and the drillhole 204. The cement 230, for example, may secure the casings 220 and 222 (and any other casings or liners of the drillhole 204) through the subterranean layers under the terranean surface 202. In some aspects, the cement 230 may be installed along the entire length of the casings (e.g., casings 220 and 222 and any other casings), or the cement 230 could be used along certain portions of the casings if adequate for a particular drillhole 202. The cement 230 can also provide an additional layer of confinement for the hazardous material in canisters 226.

The drillhole 204 and associated casings 220 and 222 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 220 may extend down to about 2500 feet TVD, with a diameter of between about 22 in. and 48 in. An intermediate casing (not shown) between the surface casing 220 and production casing 222 may extend down to about 8000 feet TVD, with a diameter of between about 16 in. and 36 in. The production casing 222 may extend inclinedly (e.g., to case the substantially horizontal portion 210 and/or the inclined portion 240) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (212, 214, and 216), particular drilling techniques, as well as a size, shape, or design of a hazardous material canister 226 that contains hazardous material to be deposited in the hazardous material storage repository system 200. In some alternative examples, the production casing 222 (or other casing in the drillhole 204) could be circular in cross-section, elliptical in cross-section, or some other shape.

As illustrated, the vertical portion 206 of the drillhole 204 extends through subterranean layers 212, 214, and 216, and, in this example, lands in a subterranean layer 219. As discussed above, the surface layer 212 may or may not include mobile water. Subterranean layer 214, which is below the surface layer 212, in this example, is a mobile water layer 214. For instance, mobile water layer 214 may include one or more sources of mobile water, such as freshwater aquifers, salt water or brine, or other source of mobile water. In this example of hazardous material storage repository system 200, mobile water may be water that moves through a subterranean layer based on a pressure differential across all or a part of the subterranean layer. For example, the mobile water layer 214 may be a permeable geologic formation in which water freely moves (e.g., due to pressure differences or otherwise) within the layer 214. In some aspects, the mobile water layer 214 may be a primary source of human-consumable water in a particular geographic area. Examples of rock formations of which the mobile water layer 214 may be composed include porous sandstones and limestones, among other formations.

Other illustrated layers, such as the impermeable layer 216 and the storage layer 219, may include immobile water. Immobile water, in some aspects, is water (e.g., fresh, salt, brine), that is not fit for human or animal consumption, or both. Immobile water, in some aspects, may be water that, by its motion through the layers 216 or 219 (or both), cannot reach the mobile water layer 214, terranean surface 202, or both, within 10,000 years or more (such as to 1,000,000 years).

Below the mobile water layer 214, in this example implementation of hazardous material storage repository system 200, is an impermeable layer 216. The impermeable layer 216, in this example, may not allow mobile water to pass through. Thus, relative to the mobile water layer 214, the impermeable layer 216 may have low permeability, e.g., on the order of 0.01 millidarcy permeability. Additionally, in this example, the impermeable layer 216 may be a relatively non-ductile (i.e., brittle) geologic formation. One measure of non-ductility is brittleness, which is the ratio of compressive stress to tensile strength. In some examples, the brittleness of the impermeable layer 216 may be between about 20 MPa and 40 MPa.

As shown in this example, the impermeable layer 216 is shallower (e.g., closer to the terranean surface 202) than the storage layer 219. In this example rock formations of which the impermeable layer 216 may be composed include, for example, certain kinds of sandstone, mudstone, clay, and slate that exhibit permeability and brittleness properties as described above. In alternative examples, the impermeable layer 216 may be deeper (e.g., further from the terranean surface 202) than the storage layer 219. In such alternative examples, the impermeable layer 216 may be composed of an igneous rock, such as granite.

Below the impermeable layer 216 is the storage layer 219. The storage layer 219, in this example, may be chosen as the landing for the substantially horizontal portion 210, which stores the hazardous material, for several reasons. Relative to the impermeable layer 216 or other layers, the storage layer 219 may be thick, e.g., between about 100 and 200 feet of total vertical thickness. Thickness of the storage layer 219 may allow for easier landing and directional drilling, thereby allowing the substantially horizontal portion 210 to be readily emplaced within the storage layer 219 during constructions (e.g., drilling). If formed through an approximate horizontal center of the storage layer 219, the substantially horizontal portion 210 may be surrounded by about 50 to 100 feet of the geologic formation that comprises the storage layer 219. Further, the storage layer 219 may also have only immobile water, e.g., due to a very low permeability of the layer 219 (e.g., on the order of milli- or nanodarcys). In addition, the storage layer 219 may have sufficient ductility, such that a brittleness of the rock formation that comprises the layer 219 is between about 3 MPa and 10 MPa. Examples of rock formations of which the storage layer 219 may be composed include: shale and anhydrite. Further, in some aspects, hazardous material may be stored below the storage layer, even in a permeable formation such as sandstone or limestone, if the storage layer is of sufficient geologic properties to isolate the permeable layer from the mobile water layer 214.

In some examples implementations of the hazardous material storage repository system 200, the storage layer 219 (and/or the impermeable layer 216) is composed of shale. Shale, in some examples, may have properties that fit within those described above for the storage layer 219. For example, shale formations may be suitable for a long-term confinement of hazardous material (e.g., in the hazardous material canisters 226), and for their isolation from mobile water layer 214 (e.g., aquifers) and the terranean surface 202. Shale formations may be found relatively deep in the Earth, typically 3000 feet or greater, and placed in isolation below any fresh water aquifers. Other formations may include salt or other impermeable formation layer.

Shale formations (or salt or other impermeable formation layers), for instance, may include geologic properties that enhance the long-term (e.g., thousands of years) isolation of material. Such properties, for instance, have been illustrated through the long term storage (e.g., tens of millions of years) of hydrocarbon fluids (e.g., gas, liquid, mixed phase fluid) without escape of such fluids into surrounding layers (e.g., mobile water layer 214). Indeed, shale has been shown to hold natural gas for millions of years or more, giving it a proven capability for long-term storage of hazardous material. Example shale formations (e.g., Marcellus, Eagle Ford, Barnett, and otherwise) has stratification that contains many redundant sealing layers that have been effective in preventing movement of water, oil, and gas for millions of years, lacks mobile water, and can be expected (e.g., based on geological considerations) to seal hazardous material (e.g., fluids or solids) for thousands of years after deposit.

In some aspects, the formation of the storage layer 219 and/or the impermeable layer 216 may form a leakage barrier, or barrier layer to fluid leakage that may be determined, at least in part, by the evidence of the storage capacity of the layer for hydrocarbons or other fluids (e.g., carbon dioxide) for hundreds of years, thousands of years, tens of thousands of years, hundreds of thousands of years, or even millions of years. For example, the barrier layer of the storage layer 219 and/or impermeable layer 216 may be defined by a time constant for leakage of the hazardous material of more than 10,000 years (such as between 10,000 years and 1,000,000 years) based on such evidence of hydrocarbon or other fluid storage.

Shale (or salt or other impermeable layer) formations may also be at a suitable depth, e.g., between 3000 and 12,000 feet TVD. Such depths are typically below ground water aquifer (e.g., surface layer 212 and/or mobile water layer 214). Further, the presence of soluble elements in shale, including salt, and the absence of these same elements in aquifer layers, demonstrates a fluid isolation between shale and the aquifer layers.

Another particular quality of shale that may advantageously lend itself to hazardous material storage is its clay content, which, in some aspects, provides a measure of ductility greater than that found in other, impermeable rock formations (e.g., impermeable layer 216). For example, shale may be stratified, made up of thinly alternating layers of clays (e.g., between about 20-30% clay by volume) and other minerals. Such a composition may make shale less brittle and, thus less susceptible to fracturing (e.g., naturally or otherwise) as compared to rock formations in the impermeable layer (e.g., dolomite or otherwise). For example, rock formations in the impermeable layer 216 may have suitable permeability for the long term storage of hazardous material, but are too brittle and commonly are fractured. Thus, such formations may not have sufficient sealing qualities (as evidenced through their geologic properties) for the long term storage of hazardous material.

The present disclosure contemplates that there may be many other layers between or among the illustrated subterranean layers 212, 214, 216, and 219. For example, there may be repeating patterns (e.g., vertically), of one or more of the mobile water layer 214, impermeable layer 216, and storage layer 219. Further, in some instances, the storage layer 219 may be directly adjacent (e.g., vertically) the mobile water layer 214, i.e., without an intervening impermeable layer 216. In some examples, all or portions of the J-section drillhole 208 and the substantially horizontal portion 210 (and/or the inclined portion 240) may be formed below the storage layer 219, such that the storage layer 219 (e.g., shale or other geologic formation with characteristics as described herein) is vertically positioned between the substantially horizontal portion 210 (and/or the inclined portion 240) and the mobile water layer 214.

Although not illustrated in this particular example shown in FIG. 2, a self-healing layer (e.g., such as the self-healing layer 132) may be found below the terranean surface 202 and between, for example, the surface 202 and one or both of the impermeable layer 216 and the storage layer 219. In some aspects, the self-healing layer may comprise a geologic formation that can stop or impede a flow of hazardous material (whether in liquid, solid, or gaseous form) from a storage portion of the drillhole 204 to or toward the terranean surface 202. For example, during formation of the drillhole 204 (e.g., drilling), all are portions of the geologic formations of the layers 212, 214, 216, and 219, may be damaged, thereby affecting or changing their geologic characteristics (e.g., permeability).

In certain aspects, the location of the drillhole 204 may be selected so as to be formed through the self-healing layer. For example, as shown, the drillhole 204 may be formed such that at least a portion of the vertical portion 206 of the drillhole 204 is formed to pass through the self-healing layer. In some aspects, the self-healing layer comprises a geologic formation that that does not sustain cracks for extended time durations even after being drilled therethrough. Examples of the geologic formation in the self-healing layer include clay or dolomite. Cracks in such rock formations tend to heal, that is, they disappear rapidly with time due to the relative ductility of the material, and the enormous pressures that occur underground from the weight of the overlying rock on the formation in the self-healing layer. In addition to providing a "healing mechanism" for cracks that occur due to the formation of the drillhole 204 (e.g., drilling or otherwise), the self-healing layer may also provide a barrier to natural faults and other cracks that otherwise could provide a pathway for hazardous material leakage (e.g., fluid or solid) from the storage region (e.g., in the substantially horizontal portion 210) to the terranean surface 202, the mobile water layer 214, or both.

As shown in this example, the substantially horizontal portion 210 of the drillhole 204 includes a storage area 217 in a distal part of the portion 210 into which hazardous material may be retrievably placed for long-term storage.

For example, as shown, a work string 224 (e.g., tubing, coiled tubing, wireline, or otherwise) may be extended into the cased drillhole 204 to place one or more (three shown but there may be more or less) hazardous material canisters 226 into long term, but in some aspects, retrievable, storage in the portion 210. For example, in the implementation shown in FIG. 2, the work string 224 may include a downhole tool 228 that couples to the canister 226, and with each trip into the drillhole 204, the downhole tool 228 may deposit a particular hazardous material canister 226 in the substantially horizontal portion 210.

The downhole tool 228 may couple to the canister 226 by, in some aspects, a threaded connection or other type of connection, such as a latched connection. In alternative aspects, the downhole tool 228 may couple to the canister 226 with an interlocking latch, such that rotation (or linear movement or electric or hydraulic switches) of the downhole tool 228 may latch to (or unlatch from) the canister 226. In alternative aspects, the downhole tool 224 may include one or more magnets (e.g., rare Earth magnets, electromagnets, a combination thereof, or otherwise) which attractingly couple to the canister 226. In some examples, the canister 226 may also include one or more magnets (e.g., rare Earth magnets, electromagnets, a combination thereof, or otherwise) of an opposite polarity as the magnets on the downhole tool 224. In some examples, the canister 226 may be made from or include a ferrous or other material attractable to the magnets of the downhole tool 224.

As another example, each canister 226 may be positioned within the drillhole 204 by a drillhole tractor (e.g., on a wireline or otherwise), which may push or pull the canister into the substantially horizontal portion 210 through motorized (e.g., electric) motion. As yet another example, each canister 226 may include or be mounted to rollers (e.g., wheels), so that the downhole tool 224 may push the canister 226 into the cased drillhole 204.

In some example implementations, the canister 226, one or more of the drillhole casings 220 and 222, or both, may be coated with a friction-reducing coating prior to the deposit operation. For example, by applying a coating (e.g., petroleum-based product, resin, ceramic, or otherwise) to the canister 226 and/or drillhole casings, the canister 226 may be more easily moved through the cased drillhole 204 into the substantially horizontal portion 210. In some aspects, only a portion of the drillhole casings may be coated. For example, in some aspects, the substantially vertical portion 206 may not be coated, but the J-section portion 208 or the substantially horizontal portion 210, or both, may be coated to facilitate easier deposit and retrieval of the canister 226.

FIG. 2 also illustrates an example of a retrieval operation of hazardous material in the substantially horizontal portion 210 of the drillhole 204. A retrieval operation may be the opposite of a deposit operation, such that the downhole tool 224 (e.g., a fishing tool) may be run into the drillhole 204, coupled to the last-deposited canister 226 (e.g., threadingly, latched, by magnet, or otherwise), and pull the canister 226 to the terranean surface 202. Multiple retrieval trips may be made by the downhole tool 224 in order to retrieve multiple canisters from the substantially horizontal portion 210 of the drillhole 204.

Each canister 226 may enclose hazardous material. Such hazardous material, in some examples, may be biological or chemical waste or other biological or chemical hazardous material. In some examples, the hazardous material may include nuclear material, such as spent nuclear fuel recovered from a nuclear reactor (e.g., commercial power or test reactor) or military nuclear material. For example, a gigawatt nuclear plant may produce 30 tons of spent nuclear fuel per year. The density of that fuel is typically close to 10 (10 gm/cm$^3$=10 kg/liter), so that the volume for a year of nuclear waste is about 3 m$^3$. Spent nuclear fuel, in the form of nuclear fuel pellets, may be taken from the reactor and not modified. Nuclear fuel pellet are solid, although they can contain and emit a variety of radioactive gases including tritium (13 year half-life), krypton-85 (10.8 year half-life), and carbon dioxide containing C-14 (5730 year half-life).

In some aspects, the storage layer 219 should be able to contain any radioactive output (e.g., gases) within the layer 219, even if such output escapes the canisters 226. For example, the storage layer 219 may be selected based on diffusion times of radioactive output through the layer 219. For example, a minimum diffusion time of radioactive output escaping the storage layer 219 may be set at, for example, fifty times a half-life for any particular component of the nuclear fuel pellets. Fifty half-lives as a minimum diffusion time would reduce an amount of radioactive output by a factor of $1 \times 10^{-15}$. As another example, setting a minimum diffusion time to thirty half-lives would reduce an amount of radioactive output by a factor of one billion.

For example, plutonium-239 is often considered a dangerous waste product in spent nuclear fuel because of its long half-life of 24,100 years. For this isotope, 50 half-lives would be 1.2 million years. Plutonium-239 has low solubility in water, is not volatile, and as a solid is not capable of diffusion through a matrix of the rock formation that comprises the illustrated storage layer 219 (e.g., shale or other formation). The storage layer 219, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

As further shown in FIG. 2, the storage canisters 226 may be positioned for long term storage in the substantially horizontal portion 210, which, as shown, is coupled to the vertical portion 106 of the drillhole 104 through the J-section portion 208. As illustrated, the J-section portion 208 includes an upwardly directed portion angled toward the terranean surface 202. In some aspects, for example when there is radioactive hazardous material stored in the canisters 226, this inclination of the J-section portion 208 (and inclination of the inclined portion 240, if formed) may provide a further degree of safety and containment to prevent or impede the material, even if leaked from the canister 226, from reaching, e.g., the mobile water layer 214, the vertical portion 206 of the drillhole 204, the terranean surface 202, or a combination thereof. For example, radionuclides of concern in the hazardous material tend to be relatively buoyant or heavy (as compared to other components of the material). Buoyant radionuclides may be the greatest concern for leakage, since heavy elements and molecules tend to sink, and would not diffuse upward towards the terranean surface 202. Krypton gas, and particularly krypton-85, is a buoyant radioactive element that is heavier than air (as are most gases) but much lighter than water. Thus, should krypton-85 be introduced into a water bath, such gas would tend to float upward towards the terranean surface 202. Iodine, on the other hand, is denser than water, and would tend to diffuse downward if introduced into a water bath.

By including the J-section portion 208 of the drillhole 204, any such diffusion of radioactive material (e.g., even if leaked from a canister 226 and in the presence of water or other liquid in the drillhole 204 or otherwise) would be directed angularly upward toward the substantially horizontal portion 210, and more specifically, toward a distal end 221 of the substantially horizontal portion 210 and away from the J-section portion 208 (and the vertical portion 206) of the drillhole 204. Thus, leaked hazardous material, even in a diffusible gas form, would not be offered a path (e.g., directly) to the terranean surface 202 (or the mobile water layer 214) through the vertical portion 206 of the drillhole 210. For instance, the leaked hazardous material (especially in gaseous form) would be directed and gathered at the distal end 221 of the drillhole portion 210, or, generally, within the substantially horizontal portion 210 of the drillhole 204.

Alternative methods of depositing the canisters 226 into the inclined drillhole portion 210 may also be implemented. For instance, a fluid (e.g., liquid or gas) may be circulated through the drillhole 204 to fluidly push the canisters 226 into the inclined drillhole portion 210. In some example, each canister 226 may be fluidly pushed separately. In alternative aspects, two or more canisters 226 may be fluidly pushed, simultaneously, through the drillhole 204 for deposit into the substantially horizontal portion 210. The fluid can be, in some cases, water. Other examples include a drilling mud or drilling foam. In some examples, a gas may be used to push the canisters 226 into the drillhole, such as air, argon, or nitrogen.

In some aspects, the choice of fluid may depend at least in part on a viscosity of the fluid. For example, a fluid may be chosen with enough viscosity to impede the drop of the canister 226 into the substantially vertical portion 206. This resistance or impedance may provide a safety factor against a sudden drop of the canister 226. The fluid may also provide lubrication to reduce a sliding friction between the canister 226 and the casings 220 and 222. The canister 226 can be conveyed within a casing filled with a liquid of controlled viscosity, density, and lubricant qualities. The fluid-filled annulus between the inner diameter of the casings 220 and 222 and the outer diameter of the conveyed canister 226 represents an opening designed to dampen any high rate of canister motion, providing automatic passive protection in an unlikely decoupling of the conveyed canister 226.

In some aspects, other techniques may be employed to facilitate deposit of the canister 226 into the substantially horizontal portion 210. For example, one or more of the installed casings (e.g., casings 220 and 222) may have rails to guide the storage canister 226 into the drillhole 202 while reducing friction between the casings and the canister 226. The storage canister 226 and the casings (or the rails) may be made of materials that slide easily against one another. The casings may have a surface that is easily lubricated, or one that is self-lubricating when subjected to the weight of the storage canister 226.

The fluid may also be used for retrieval of the canister 226. For example, in an example retrieval operation, a volume within the casings 220 and 222 may be filled with a compressed gas (e.g., air, nitrogen, argon, or otherwise). As the pressure increases at an end of the substantially horizontal portion 210, the canisters 226 may be pushed toward the J-section portion 208, and subsequently through the substantially vertical portion 206 to the terranean surface.

In some aspects, the drillhole 204 may be formed for the primary purpose of long-term storage of hazardous materials. In alternative aspects, the drillhole 204 may have been previously formed for the primary purpose of hydrocarbon production (e.g., oil, gas). For example, storage layer 219 may be a hydrocarbon bearing formation from which hydrocarbons were produced into the drillhole 204 and to the terranean surface 202. In some aspects, the storage layer 219 may have been hydraulically fractured prior to hydrocarbon production. Further in some aspects, the production casing 222 may have been perforated prior to hydraulic fracturing. In such aspects, the production casing 222 may be patched (e.g., cemented) to repair any holes made from the perforating process prior to a deposit operation of hazardous material. In addition, any cracks or openings in the cement between the casing and the drillhole can also be filled at that time.

For example, in the case of spent nuclear fuel as a hazardous material, the drillhole may be formed at a particular location, e.g., near a nuclear power plant, as a new drillhole provided that the location also includes an appropriate storage layer 219, such as a shale formation. Alternatively, an existing well that has already produced shale gas, or one that was abandoned as "dry," (e.g., with sufficiently low organics that the gas in place is too low for commercial development), may be selected as the drillhole 204. In some aspects, prior hydraulic fracturing of the storage layer 219 through the drillhole 204 may make little difference in the hazardous material storage capability of the drillhole 204. But such a prior activity may also confirm the ability of the storage layer 219 to store gases and other fluids for millions of years. If, therefore, the hazardous material or output of the hazardous material (e.g., radioactive gasses or otherwise) were to escape from the canister 226 and enter the fractured formation of the storage layer 219, such fractures may allow that material to spread relatively rapidly over a distance comparable in size to that of the fractures. In some aspects, the drillhole 202 may have been drilled for a production of hydrocarbons, but production of such hydrocarbons had failed, e.g., because the storage layer 219 comprised a rock formation (e.g., shale or otherwise) that was too ductile and difficult to fracture for production, but was advantageously ductile for the long-term storage of hazardous material.

FIG. 3 is a schematic illustration of example implementations of another hazardous material storage repository system, e.g., a subterranean location for the long-term (e.g., tens, hundreds, or thousands of years or more) but retrievable safe and secure storage of hazardous material, during a deposit or retrieval operation according to the present disclosure. For example, turning to FIG. 3, this figure illustrates an example hazardous material storage repository system 300 during a deposit (or retrieval, as described below) process, e.g., during deployment of one or more canisters of hazardous material in a subterranean formation. As illustrated, the hazardous material storage repository system 300 includes a drillhole 304 formed (e.g., drilled or otherwise) from a terranean surface 302 and through multiple subterranean layers 312, 314, and 316. Although the terranean surface 302 is illustrated as a land surface, terranean surface 302 may be a sub-sea or other underwater surface, such as a lake or an ocean floor or other surface under a body of water. Thus, the present disclosure contemplates that the drillhole 304 may be formed under a body of water from a drilling location on or proximate the body of water.

The illustrated drillhole 304 is a directional drillhole in this example of hazardous material storage repository system 300. For instance, the drillhole 304 includes a substantially vertical portion 306 coupled to a curved portion 308, which in turn is coupled to a vertically undulating portion 310. As used in the present disclosure, "substantially" in the context of a drillhole orientation, refers to drillholes that may not be exactly vertical (e.g., exactly perpendicular to the terranean surface 302) or exactly horizontal (e.g., exactly parallel to the terranean surface 302), or exactly inclined at a particular incline angle relative to the terranean surface 302. In other words, vertical drillholes often undulate offset from a true vertical direction, that they might be drilled at an angle that deviates from true vertical, and horizontal drillholes often undulate offset from exactly horizontal. Further, in some aspects, an undulating portion may not undulate with regularity, i.e., have peaks that are uniformly spaced apart or valleys that are uniformly spaced apart. Instead, an undulating drillhole may undulate irregularly, e.g., with peaks that are non-uniformly spaced and/or valleys that are non-uniformly spaced. Further, an undulated drillhole may have a peak-to-valley distance that varies along a length of the drillhole. As illustrated in this example, the three portions of the drillhole 304—the vertical portion 306, the curved portion 308, and the vertically undulating portion 310—form a continuous drillhole 304 that extends into the Earth.

The illustrated drillhole 304, in this example, has a surface casing 320 positioned and set around the drillhole 304 from the terranean surface 302 into a particular depth in the Earth. For example, the surface casing 320 may be a relatively large-diameter tubular member (or string of members) set (e.g., cemented) around the drillhole 304 in a shallow formation. As used herein, "tubular" may refer to a member that has a circular cross-section, elliptical cross-section, or other shaped cross-section. For example, in this implementation of the hazardous material storage repository system 300, the surface casing 320 extends from the terranean surface through a surface layer 312. The surface layer 312, in this example, is a geologic layer comprised of one or more layered rock formations. In some aspects, the surface layer 312 in this example may or may not include freshwater aquifers, salt water or brine sources, or other sources of mobile water (e.g., water that moves through a geologic formation). In some aspects, the surface casing 320 may isolate the drillhole 304 from such mobile water, and may also provide a hanging location for other casing strings to be installed in the drillhole 304. Further, although not shown, a conductor casing may be set above the surface casing 320 (e.g., between the surface casing 320 and the surface 302 and within the surface layer 312) to prevent drilling fluids from escaping into the surface layer 312.

As illustrated, a production casing 322 is positioned and set within the drillhole 304 downhole of the surface casing 320. Although termed a "production" casing, in this example, the casing 322 may or may not have been subject to hydrocarbon production operations. Thus, the casing 322 refers to and includes any form of tubular member that is set (e.g., cemented) in the drillhole 304 downhole of the surface casing 320. In some examples of the hazardous material storage repository system 300, the production casing 322 may begin at an end of the curved portion 308 and extend throughout the vertically undulating portion 310. The casing 322 could also extend into the curved portion 308 and into the vertical portion 306.

As shown, cement 330 is positioned (e.g., pumped) around the casings 320 and 322 in an annulus between the casings 320 and 322 and the drillhole 304. The cement 330, for example, may secure the casings 320 and 322 (and any other casings or liners of the drillhole 304) through the subterranean layers under the terranean surface 302. In some aspects, the cement 330 may be installed along the entire length of the casings (e.g., casings 320 and 322 and any other casings), or the cement 330 could be used along certain portions of the casings if adequate for a particular drillhole 302. The cement 330 can also provide an additional layer of confinement for the hazardous material in canisters 326.

The drillhole 304 and associated casings 320 and 322 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 320 may extend down to about 2500 feet TVD, with a diameter of between about 22 in. and 48 in. An intermediate casing (not shown) between the surface casing 320 and production casing 322 may extend down to about 8000 feet TVD, with a diameter of between about 16 in. and 36 in. The production casing 322 may extend inclinedly (e.g., to case the vertically undulating portion 310) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (312, 314, and 316), particular drilling techniques, as well as a size, shape, or design of a hazardous material canister 326 that contains hazardous material to be deposited in the hazardous material storage repository system 300. In some alternative examples, the production casing 322 (or other casing in the drillhole 304) could be circular in cross-section, elliptical in cross-section, or some other shape.

As illustrated, the vertical portion 306 of the drillhole 304 extends through subterranean layers 312, 314, and 316, and, in this example, lands in a subterranean layer 319. As discussed above, the surface layer 312 may or may not include mobile water. Subterranean layer 314, which is below the surface layer 312, in this example, is a mobile water layer 314. For instance, mobile water layer 314 may include one or more sources of mobile water, such as freshwater aquifers, salt water or brine, or other source of mobile water. In this example of hazardous material storage repository system 300, mobile water may be water that moves through a subterranean layer based on a pressure differential across all or a part of the subterranean layer. For example, the mobile water layer 314 may be a permeable geologic formation in which water freely moves (e.g., due to pressure differences or otherwise) within the layer 314. In some aspects, the mobile water layer 314 may be a primary source of human-consumable water in a particular geographic area. Examples of rock formations of which the mobile water layer 314 may be composed include porous sandstones and limestones, among other formations.

Other illustrated layers, such as the impermeable layer 316 and the storage layer 319, may include immobile water. Immobile water, in some aspects, is water (e.g., fresh, salt, brine), that is not fit for human or animal consumption, or both. Immobile water, in some aspects, may be water that, by its motion through the layers 316 or 319 (or both), cannot reach the mobile water layer 314, terranean surface 302, or both, within 10,000 years or more (such as to 1,000,000 years).

Below the mobile water layer 314, in this example implementation of hazardous material storage repository system 300, is an impermeable layer 316. The impermeable layer 316, in this example, may not allow mobile water to pass through. Thus, relative to the mobile water layer 314, the impermeable layer 316 may have low permeability, e.g., on the order of nanodarcy permeability. Additionally, in this example, the impermeable layer 316 may be a relatively non-ductile (i.e., brittle) geologic formation. One measure of non-ductility is brittleness, which is the ratio of compressive stress to tensile strength. In some examples, the brittleness of the impermeable layer 316 may be between about 20 MPa and 40 MPa.

As shown in this example, the impermeable layer 316 is shallower (e.g., closer to the terranean surface 302) than the storage layer 319. In this example rock formations of which the impermeable layer 316 may be composed include, for example, certain kinds of sandstone, mudstone, clay, and slate that exhibit permeability and brittleness properties as described above. In alternative examples, the impermeable layer 316 may be deeper (e.g., further from the terranean surface 302) than the storage layer 319. In such alternative examples, the impermeable layer 316 may be composed of an igneous rock, such as granite.

Below the impermeable layer 316 is the storage layer 319. The storage layer 319, in this example, may be chosen as the landing for the vertically undulating portion 310, which stores the hazardous material, for several reasons. Relative to the impermeable layer 316 or other layers, the storage layer 319 may be thick, e.g., between about 100 and 200 feet of total vertical thickness. Thickness of the storage layer 319 may allow for easier landing and directional drilling, thereby allowing the vertically undulating portion 310 to be readily emplaced within the storage layer 319 during constructions (e.g., drilling). If formed through an approximate horizontal center of the storage layer 319, the vertically undulating portion 310 may be surrounded by about 50 to 100 feet of the geologic formation that comprises the storage layer 319. Further, the storage layer 319 may also have only immobile water, e.g., due to a very low permeability of the layer 319 (e.g., on the order of milli- or nanodarcys). In addition, the storage layer 319 may have sufficient ductility, such that a brittleness of the rock formation that comprises the layer 319 is between about 3 MPa and 10 MPa. Examples of rock formations of which the storage layer 319 may be composed include: shale and anhydrite. Further, in some aspects, hazardous material may be stored below the storage layer, even in a permeable formation such as sandstone or limestone, if the storage layer is of sufficient geologic properties to isolate the permeable layer from the mobile water layer 314.

In some examples implementations of the hazardous material storage repository system 300, the storage layer 319 (and/or the impermeable layer 316) is composed of shale. Shale, in some examples, may have properties that fit within those described above for the storage layer 319. For example, shale formations may be suitable for a long-term confinement of hazardous material (e.g., in the hazardous material canisters 326), and for their isolation from mobile water layer 314 (e.g., aquifers) and the terranean surface 302. Shale formations may be found relatively deep in the Earth, typically 3000 feet or greater, and placed in isolation below any fresh water aquifers. Other formations may include salt or other impermeable formation layer.

Shale formations (or salt or other impermeable formation layers), for instance, may include geologic properties that enhance the long-term (e.g., thousands of years) isolation of material. Such properties, for instance, have been illustrated through the long term storage (e.g., tens of millions of years) of hydrocarbon fluids (e.g., gas, liquid, mixed phase fluid) without escape of such fluids into surrounding layers (e.g., mobile water layer 314). Indeed, shale has been shown to hold natural gas for millions of years or more, giving it a proven capability for long-term storage of hazardous material. Example shale formations (e.g., Marcellus, Eagle Ford, Barnett, and otherwise) has stratification that contains many redundant sealing layers that have been effective in preventing movement of water, oil, and gas for millions of years, lacks mobile water, and can be expected (e.g., based on geological considerations) to seal hazardous material (e.g., fluids or solids) for thousands of years after deposit.

In some aspects, the formation of the storage layer 319 and/or the impermeable layer 316 may form a leakage barrier, or barrier layer to fluid leakage that may be determined, at least in part, by the evidence of the storage capacity of the layer for hydrocarbons or other fluids (e.g., carbon dioxide) for hundreds of years, thousands of years, tens of thousands of years, hundreds of thousands of years, or even millions of years. For example, the barrier layer of the storage layer 319 and/or impermeable layer 316 may be defined by a time constant for leakage of the hazardous material more than 10,000 years (such as between 10,000 years and 1,000,000 years) based on such evidence of hydrocarbon or other fluid storage.

Shale (or salt or other impermeable layer) formations may also be at a suitable depth, e.g., between 3000 and 12,000 feet TVD. Such depths are typically below ground water aquifer (e.g., surface layer 312 and/or mobile water layer 314). Further, the presence of soluble elements in shale, including salt, and the absence of these same elements in aquifer layers, demonstrates a fluid isolation between shale and the aquifer layers.

Another particular quality of shale that may advantageously lend itself to hazardous material storage is its clay content, which, in some aspects, provides a measure of ductility greater than that found in other, impermeable rock formations (e.g., impermeable layer 316). For example, shale may be stratified, made up of thinly alternating layers of clays (e.g., between about 20-30% clay by volume) and other minerals. Such a composition may make shale less brittle and, thus less susceptible to fracturing (e.g., naturally or otherwise) as compared to rock formations in the impermeable layer (e.g., dolomite or otherwise). For example, rock formations in the impermeable layer 316 may have suitable permeability for the long term storage of hazardous material, but are too brittle and commonly are fractured. Thus, such formations may not have sufficient sealing qualities (as evidenced through their geologic properties) for the long term storage of hazardous material.

The present disclosure contemplates that there may be many other layers between or among the illustrated subterranean layers 312, 314, 316, and 319. For example, there may be repeating patterns (e.g., vertically), of one or more of the mobile water layer 314, impermeable layer 316, and storage layer 319. Further, in some instances, the storage layer 319 may be directly adjacent (e.g., vertically) the mobile water layer 314, i.e., without an intervening impermeable layer 316. In some examples, all or portions of the curved portion 308 and the vertically undulating portion 310 may be formed below the storage layer 319, such that the storage layer 319 (e.g., shale or other geologic formation with characteristics as described herein) is vertically positioned between the vertically undulating portion 310 and the mobile water layer 314.

Although not illustrated in this particular example shown in FIG. 3, a self-healing layer (e.g., such as the self-healing layer 132) may be found below the terranean surface 302 and between, for example, the surface 302 and one or both of the impermeable layer 316 and the storage layer 319. In some aspects, the self-healing layer may comprise a geologic formation that can stop or impede a flow of hazardous material (whether in liquid, solid, or gaseous form) from a storage portion of the drillhole 304 to or toward the terranean surface 302. For example, during formation of the drillhole 304 (e.g., drilling), all are portions of the geologic formations of the layers 312, 314, 316, and 319, may be damaged, thereby affecting or changing their geologic characteristics (e.g., permeability).

In certain aspects, the location of the drillhole 304 may be selected so as to be formed through the self-healing layer. For example, as shown, the drillhole 304 may be formed such that at least a portion of the vertical portion 306 of the drillhole 304 is formed to pass through the self-healing layer. In some aspects, the self-healing layer comprises a geologic formation that that does not sustain cracks for extended time durations even after being drilled therethrough. Examples of the geologic formation in the self-healing layer include clay or dolomite. Cracks in such rock formations tend to heal, that is, they disappear rapidly with time due to the relative ductility of the material, and the enormous pressures that occur underground from the weight of the overlying rock on the formation in the self-healing layer. In addition to providing a "healing mechanism" for cracks that occur due to the formation of the drillhole 304 (e.g., drilling or otherwise), the self-healing layer may also provide a barrier to natural faults and other cracks that otherwise could provide a pathway for hazardous material leakage (e.g., fluid or solid) from the storage region (e.g., in the vertically undulating portion 310) to the terranean surface 302, the mobile water layer 314, or both.

As shown in this example, the vertically undulating portion 310 of the drillhole 304 includes a storage area 317 in a distal part of the portion 310 into which hazardous material may be retrievably placed for long-term storage. For example, as shown, a work string 324 (e.g., tubing, coiled tubing, wireline, or otherwise) may be extended into the cased drillhole 304 to place one or more (three shown but there may be more or less) hazardous material canisters 326 into long term, but in some aspects, retrievable, storage in the portion 310. For example, in the implementation shown in FIG. 3, the work string 324 may include a downhole tool 328 that couples to the canister 326, and with each trip into the drillhole 304, the downhole tool 328 may deposit a particular hazardous material canister 326 in the vertically undulating portion 310.

The downhole tool 328 may couple to the canister 326 by, in some aspects, a threaded connection or other type of connection, such as a latched connection. In alternative aspects, the downhole tool 328 may couple to the canister 326 with an interlocking latch, such that rotation (or linear movement or electric or hydraulic switches) of the downhole tool 328 may latch to (or unlatch from) the canister 326. In alternative aspects, the downhole tool 324 may include one or more magnets (e.g., rare Earth magnets, electromagnets, a combination thereof, or otherwise) which attractingly couple to the canister 326. In some examples, the canister 326 may also include one or more magnets (e.g., rare Earth magnets, electromagnets, a combination thereof, or otherwise) of an opposite polarity as the magnets on the downhole tool 324. In some examples, the canister 326 may be made from or include a ferrous or other material attractable to the magnets of the downhole tool 324.

As another example, each canister 326 may be positioned within the drillhole 304 by a drillhole tractor (e.g., on a wireline or otherwise), which may push or pull the canister into the vertically undulating portion 310 through motorized (e.g., electric) motion. As yet another example, each canister 326 may include or be mounted to rollers (e.g., wheels), so that the downhole tool 324 may push the canister 326 into the cased drillhole 304.

In some example implementations, the canister 326, one or more of the drillhole casings 320 and 322, or both, may be coated with a friction-reducing coating prior to the deposit operation. For example, by applying a coating (e.g., petroleum-based product, resin, ceramic, or otherwise) to the canister 326 and/or drillhole casings, the canister 326 may be more easily moved through the cased drillhole 304 into the vertically undulating portion 310. In some aspects, only a portion of the drillhole casings may be coated. For example, in some aspects, the substantially vertical portion 306 may not be coated, but the curved portion 308 or the vertically undulating portion 310, or both, may be coated to facilitate easier deposit and retrieval of the canister 326.

FIG. 3 also illustrates an example of a retrieval operation of hazardous material in the vertically undulating portion 310 of the drillhole 304. A retrieval operation may be the opposite of a deposit operation, such that the downhole tool 324 (e.g., a fishing tool) may be run into the drillhole 304, coupled to the last-deposited canister 326 (e.g., threadingly, latched, by magnet, or otherwise), and pull the canister 326 to the terranean surface 302. Multiple retrieval trips may be made by the downhole tool 324 in order to retrieve multiple canisters from the vertically undulating portion 310 of the drillhole 304.

Each canister 326 may enclose hazardous material. Such hazardous material, in some examples, may be biological or chemical waste or other biological or chemical hazardous material. In some examples, the hazardous material may include nuclear material, such as spent nuclear fuel recovered from a nuclear reactor (e.g., commercial power or test reactor) or military nuclear material. For example, a gigawatt nuclear plant may produce 30 tons of spent nuclear fuel per year. The density of that fuel is typically close to 10 (10 $gm/cm^3$=10 kg/liter), so that the volume for a year of nuclear waste is about 3 $m^3$. Spent nuclear fuel, in the form of nuclear fuel pellets, may be taken from the reactor and not modified. Nuclear fuel pellet are solid, although they can contain and emit a variety of radioactive gases including tritium (13 year half-life), krypton-85 (10.8 year half-life), and carbon dioxide containing C-14 (5730 year half-life).

In some aspects, the storage layer 319 should be able to contain any radioactive output (e.g., gases) within the layer 319, even if such output escapes the canisters 326. For example, the storage layer 319 may be selected based on diffusion times of radioactive output through the layer 319. For example, a minimum diffusion time of radioactive output escaping the storage layer 319 may be set at, for example, fifty times a half-life for any particular component of the nuclear fuel pellets. Fifty half-lives as a minimum diffusion time would reduce an amount of radioactive output by a factor of $1 \times 10^{-15}$. As another example, setting a minimum diffusion time to thirty half-lives would reduce an amount of radioactive output by a factor of one billion.

For example, plutonium-239 is often considered a dangerous waste product in spent nuclear fuel because of its long half-life of 24,100 years. For this isotope, 50 half-lives would be 1.2 million years. Plutonium-239 has low solubility in water, is not volatile, and as a solid is not capable of diffusion through a matrix of the rock formation that comprises the illustrated storage layer 319 (e.g., shale or other formation). The storage layer 319, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

As further shown in FIG. 3, the storage canisters 326 may be positioned for long term storage in the vertically undulating portion 310, which, as shown, is coupled to the vertical portion 106 of the drillhole 104 through the curved portion 308. As illustrated, the curved portion 308 includes an upwardly directed portion angled toward the terranean surface 302. Further, as shown, the undulating portion 310 of the drillhole 304 includes several upwardly and downwardly (relative to the surface 302) inclined portions, thereby forming several peaks and valleys in the undulating portion 310. In some aspects, for example when there is radioactive hazardous material stored in the canisters 326, these inclinations of the curved portion 308 and undulating portion 310 may provide a further degree of safety and containment to prevent or impede the material, even if leaked from the canister 326, from reaching, e.g., the mobile water layer 314, the vertical portion 306 of the drillhole 304, the terranean surface 302, or a combination thereof. For example, radionuclides of concern in the hazardous material tend to be relatively buoyant or heavy (as compared to other components of the material). Buoyant radionuclides may be the greatest concern for leakage, since heavy elements and molecules tend to sink, and would not diffuse upward towards the terranean surface 302. Krypton gas, and particularly krypton-85, is a buoyant radioactive element that is heavier than air (as are most gases) but much lighter than water. Thus, should krypton-85 be introduced into a water bath, such gas would tend to float upward towards the terranean surface 302. Iodine, on the other hand, is denser than water, and would tend to diffuse downward if introduced into a water bath.

By including the curved portion 308 of the drillhole 304 and the undulating portion 310, any such diffusion of radioactive material (e.g., even if leaked from a canister 326 and in the presence of water or other liquid in the drillhole 304 or otherwise) would be directed toward the vertically undulating portion 310, and more specifically, to peaks within the vertically undulating portion 310 and away from the curved portion 308 (and the vertical portion 306) of the drillhole 304. Thus, leaked hazardous material, even in a diffusible gas form, would not be offered a path (e.g., directly) to the terranean surface 302 (or the mobile water layer 314) through the vertical portion 306 of the drillhole 310. For instance, the leaked hazardous material (especially in gaseous form) would be directed and gathered at the peaks of the drillhole portion 310, or, generally, within the vertically undulating portion 310 of the drillhole 304.

Alternative methods of depositing the canisters 326 into the inclined drillhole portion 310 may also be implemented. For instance, a fluid (e.g., liquid or gas) may be circulated through the drillhole 304 to fluidly push the canisters 326 into the inclined drillhole portion 310. In some example, each canister 326 may be fluidly pushed separately. In alternative aspects, two or more canisters 326 may be fluidly pushed, simultaneously, through the drillhole 304 for deposit into the vertically undulating portion 310. The fluid can be, in some cases, water. Other examples include a drilling mud or drilling foam. In some examples, a gas may be used to push the canisters 326 into the drillhole, such as air, argon, or nitrogen.

In some aspects, the choice of fluid may depend at least in part on a viscosity of the fluid. For example, a fluid may be chosen with enough viscosity to impede the drop of the canister 326 into the substantially vertical portion 306. This resistance or impedance may provide a safety factor against a sudden drop of the canister 326. The fluid may also provide lubrication to reduce a sliding friction between the canister 326 and the casings 320 and 322. The canister 326 can be conveyed within a casing filled with a liquid of controlled viscosity, density, and lubricant qualities. The fluid-filled annulus between the inner diameter of the casings 320 and 322 and the outer diameter of the conveyed canister 326 represents an opening designed to dampen any high rate of canister motion, providing automatic passive protection in an unlikely decoupling of the conveyed canister 326.

In some aspects, other techniques may be employed to facilitate deposit of the canister 326 into the vertically undulating portion 310. For example, one or more of the installed casings (e.g., casings 320 and 322) may have rails to guide the storage canister 326 into the drillhole 302 while reducing friction between the casings and the canister 326. The storage canister 326 and the casings (or the rails) may be made of materials that slide easily against one another. The casings may have a surface that is easily lubricated, or one that is self-lubricating when subjected to the weight of the storage canister 326.

The fluid may also be used for retrieval of the canister 326. For example, in an example retrieval operation, a volume within the casings 320 and 322 may be filled with a compressed gas (e.g., air, nitrogen, argon, or otherwise). As the pressure increases at an end of the vertically undulating portion 310, the canisters 326 may be pushed toward the curved portion 308, and subsequently through the substantially vertical portion 306 to the terranean surface.

In some aspects, the drillhole 304 may be formed for the primary purpose of long-term storage of hazardous materials. In alternative aspects, the drillhole 304 may have been previously formed for the primary purpose of hydrocarbon production (e.g., oil, gas). For example, storage layer 319 may be a hydrocarbon bearing formation from which hydrocarbons were produced into the drillhole 304 and to the terranean surface 302. In some aspects, the storage layer 319 may have been hydraulically fractured prior to hydrocarbon production. Further in some aspects, the production casing 322 may have been perforated prior to hydraulic fracturing. In such aspects, the production casing 322 may be patched (e.g., cemented) to repair any holes made from the perforating process prior to a deposit operation of hazardous material. In addition, any cracks or openings in the cement between the casing and the drillhole can also be filled at that time.

For example, in the case of spent nuclear fuel as a hazardous material, the drillhole may be formed at a particular location, e.g., near a nuclear power plant, as a new drillhole provided that the location also includes an appropriate storage layer 319, such as a shale formation. Alternatively, an existing well that has already produced shale gas, or one that was abandoned as "dry," (e.g., with sufficiently low organics that the gas in place is too low for commercial development), may be selected as the drillhole 304. In some aspects, prior hydraulic fracturing of the storage layer 319 through the drillhole 304 may make little difference in the hazardous material storage capability of the drillhole 304. But such a prior activity may also confirm the ability of the storage layer 319 to store gases and other fluids for millions of years. If, therefore, the hazardous material or output of the hazardous material (e.g., radioactive gasses or otherwise) were to escape from the canister 326 and enter the fractured formation of the storage layer 319, such fractures may allow that material to spread relatively rapidly over a distance comparable in size to that of the fractures. In some aspects, the drillhole 302 may have been drilled for a production of hydrocarbons, but production of such hydrocarbons had failed, e.g., because the storage layer 319 comprised a rock formation (e.g., shale or otherwise) that was too ductile and difficult to fracture for production, but was advantageously ductile for the long-term storage of hazardous material.

Figure 4A:
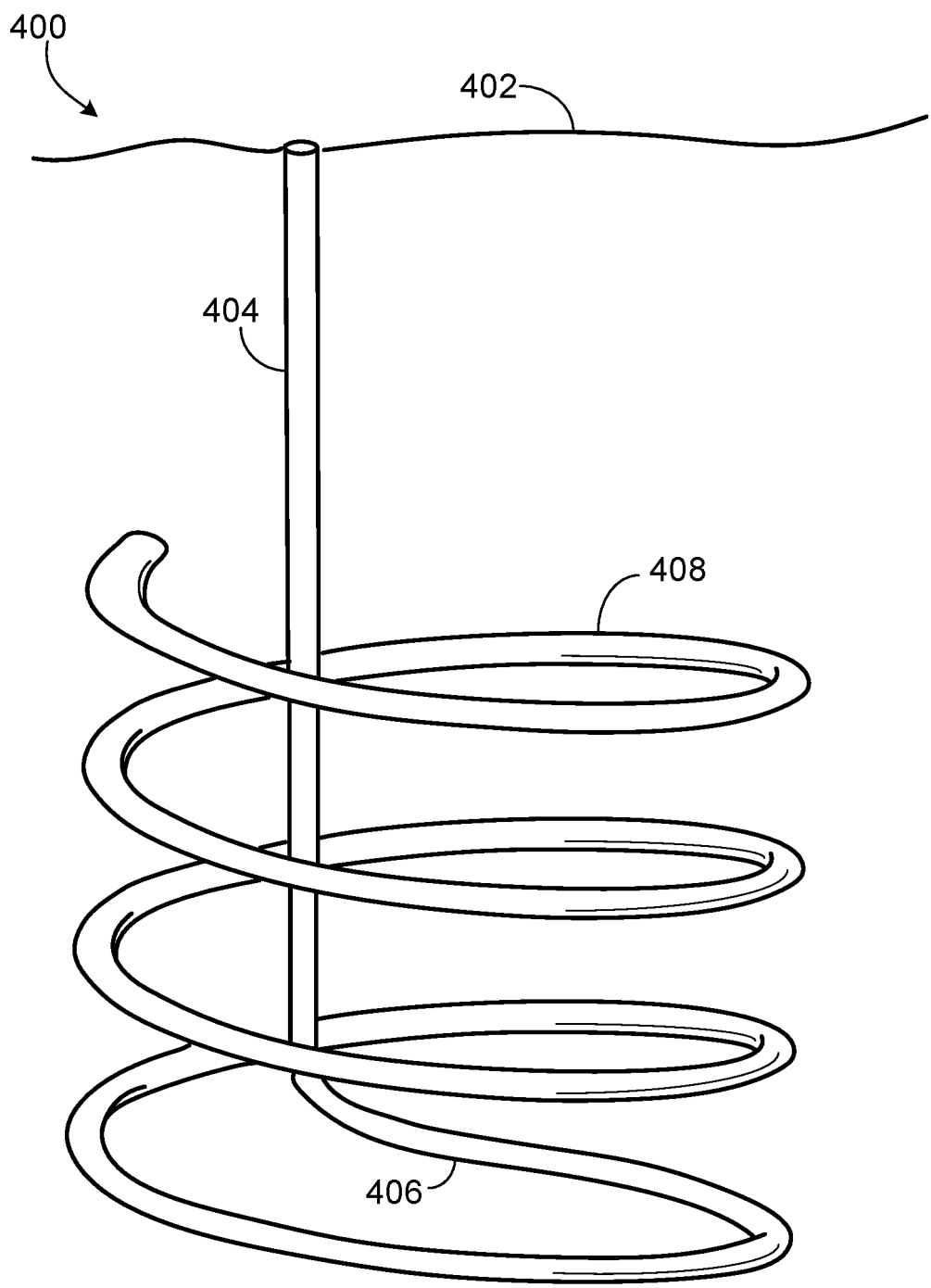
FIG. 4A-4C are schematic illustrations of other example implementations of a hazardous material storage repository system according to the present disclosure.
Figure 4B:
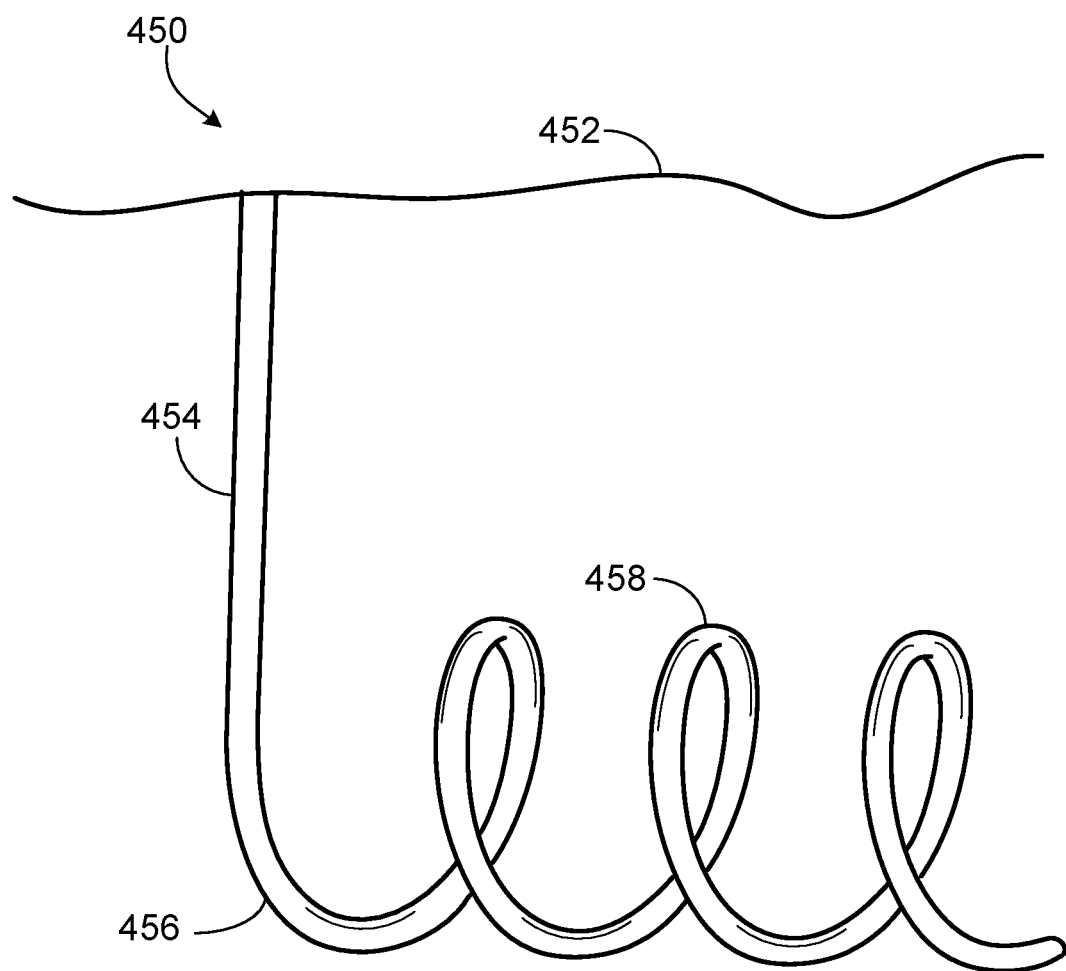
Figure 4C:
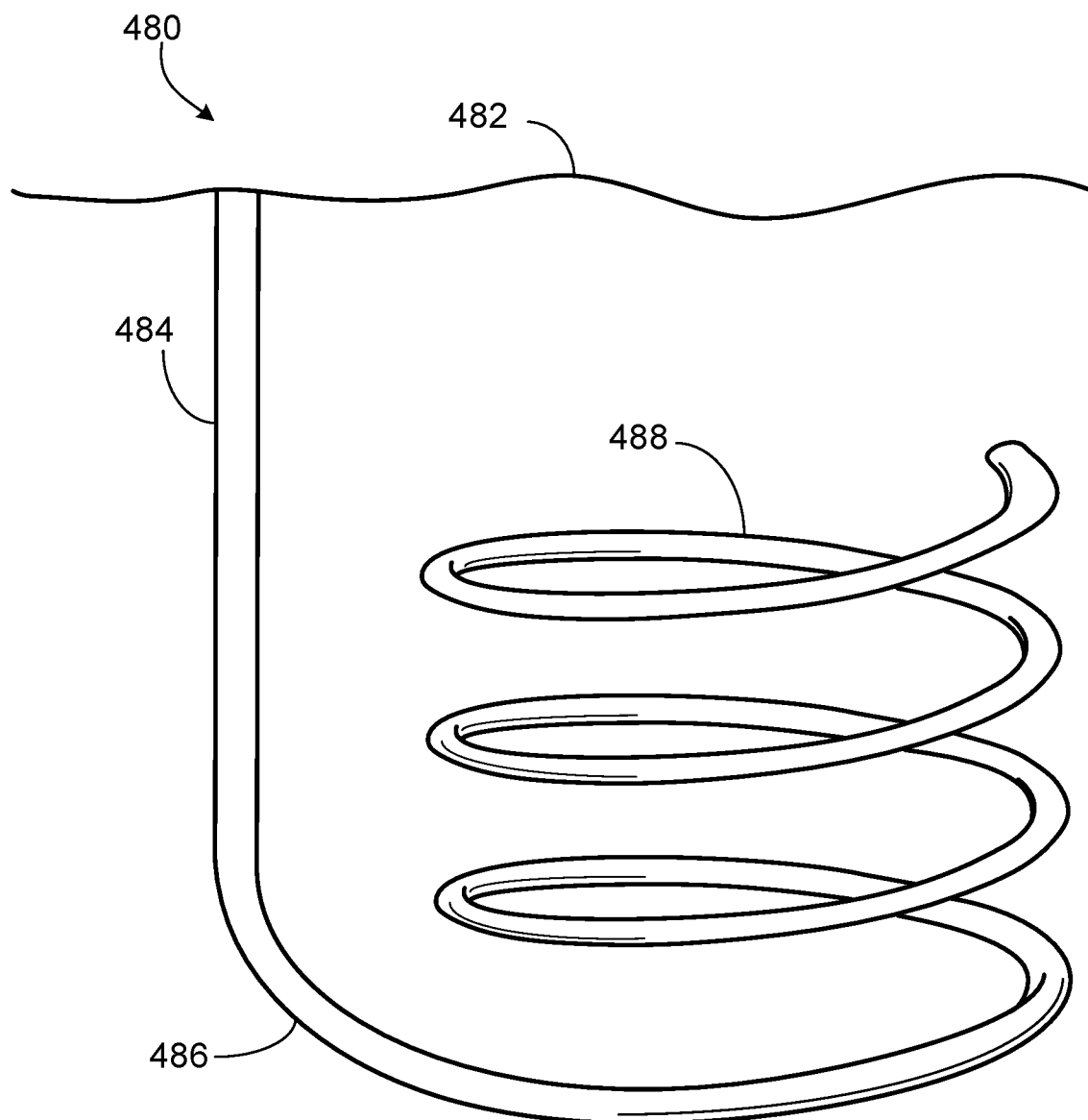

FIG. 4A-4C are schematic illustrations of other example implementations of a hazardous material storage repository system according to the present disclosure. FIG. 4A shows hazardous material storage repository system 400, FIG. 4B shows hazardous material storage repository system 450, and FIG. 4C shows hazardous material storage repository system 480. Each of the systems 400, 450, and 480 include a substantially vertical drillhole (404, 454, and 484, respectively) drilled from a terranean surface (402, 452, and 482, respectively). Each substantially vertical drillhole (404, 454, 484) couples to (or continues into) a transition drillhole (406, 456, and 486, respectively) that is a curved or radiussed drillhole. Each transition drillhole (406, 456, and 486) then couples to (or continues into) an isolation drillhole (408, 458, and 488, respectively) that includes or comprises a hazardous material storage repository into which one or more hazardous material storage canisters (e.g., canisters 126) may be placed for long-term storage and, if necessary retrieved according to the present disclosure.

As shown in FIG. 4A, the isolation drillhole 408 is a spiral drillhole that, at the point where it connects to the transition drillhole 406, starts to curve to the horizontal and simultaneously begins to curve to the side, i.e. in a horizontal direction. Once the spiral drillhole reaches its lowest point, it continues to curve in both directions, giving it a slight upward spiral. At that point the horizontal curve may be made a little bigger so that the curve does not intersect the vertical drillhole 404. Once the spiral drillhole begins to rise, a curved hazardous material storage repository section may commence. The storage section may continue until a highest point (e.g., point closest to the terranean surface 402), which is a dead-end trap (e.g., for escaped hazardous material solid, liquid, or gas). The rise of the spiral drillhole can be typically 3 degrees.

In some aspects, the path of the spiral drillhole 408 can be down the axis of the spiral (that is, in the center of the spiraling circles) or displaced. Also, as shown in FIG. 4A, the vertical drillhole 404 is formed within the spiral drillhole 408. In other words, the spiral drillhole 408 may be formed symmetrically around the vertical drillhole 404. Turning briefly to FIG. 4C, the system 480 shows a spiral drillhole 488 similar to that of the spiral drillhole 408. However, spiral drillhole 488 is formed offset and to a side of the vertical drillhole 484. In some aspects, the spiral drillhole 488 can be formed offset of any side of the vertical drillhole 484.

Turning to FIG. 4B, the system 450 includes a spiral drillhole 458 that is coupled to the transition drillhole 456 that turns from the vertical drillhole 454. Here, the spiral drillhole 458, rather than being oriented vertically (e.g., with an axis of rotation parallel of the vertical drillhole), is oriented horizontally (e.g., with an axis of rotation perpendicular to the vertical drillhole 454). At an end of or within the spiral drillhole 458 (or both) is a hazardous material storage section.

In the implementations of systems 400, 450, and 480, a radius of curvature of the transition drillholes may be about 1000 feet. The circumference of each spiral in the spiral drillholes may be about 227 times the radius of curvature, or about 6,000 feet. Thus, each spiral in the spiral drillholes may contain a bit over one mile of storage area of hazardous material canisters. In some alternative aspects, the radius of curvature may be about 500 feet. Then, each spiral of the spiral drillholes may include about 0.5 miles of storage area of hazardous material canisters. If two miles of storage is desired then there may be four spirals for each spiral drillholes of this size.

As shown in FIGS. 4A-4C, each of the systems 400, 450, and 480 include drillhole portions that serve as hazardous material storage areas and are directed vertically toward the terranean surface and away from an intersection between the transition drillhole of each system and the vertical drillhole of each section. Thus, any leaked hazardous material (e.g., such as radioactive waste gas) may be directed to such vertically-directed storage areas and away from the vertical drillholes. Each of the drillholes shown in FIGS. 4A-4C may be cased or uncased; the casing may serve as an additional layer of protection to prevent hazardous material from reaching mobile water. If casing is omitted, then angular changes to any drillhole can be more rapid with a constraint being the accommodation of movement of any canister therethrough. If there is casing, angular changes in direction for the drillholes may be done sufficiently slowly (as they are in standard directional drilling) that the casing can be pushed into the drillhole. Further, in some aspects, all or a portion of each of the illustrated isolation drillholes (408, 458, and 488) may be formed in or under an impermeable layer (as described in the present disclosure).

In some aspects, implementations of a spiral drillhole may have a constant curvature around an axis of rotation. Alternative implementations of a spiral drillhole may have a gradually changing curvature, making the spirals in the spiral drillhole either tighter or less confined. Still additional implementations of a spiral drillhole may have the spirals changing in radius (making it tighter or less tight) but have little or no vertical rise (e.g., for situations in which it might be useful if the geologic layer in which the hazardous material storage section of the isolation drillholes is not very thick in the vertical dimension).

Figure 5A:
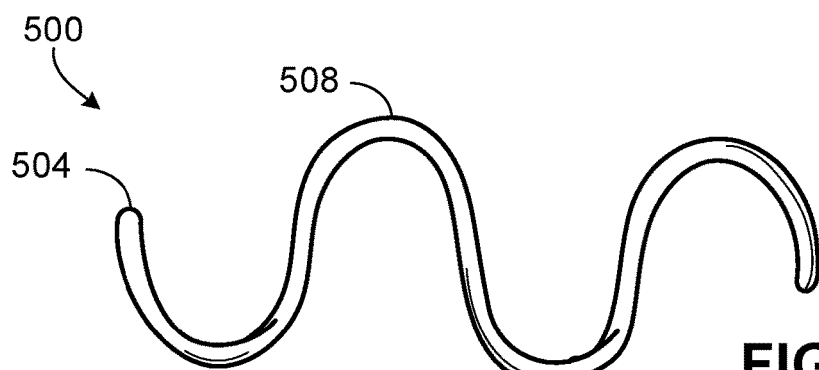
FIG. 5A is a top view.
Figure 5B:
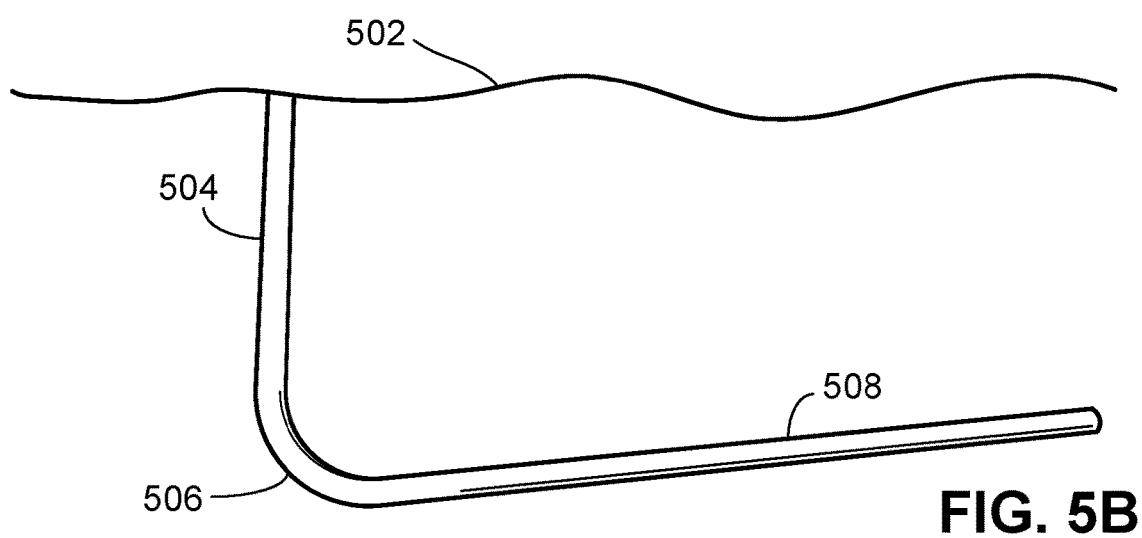
FIGS. 5B-5C are side views, of schematic illustrations of another example implementation of a hazardous material storage repository system.
Figure 5C:
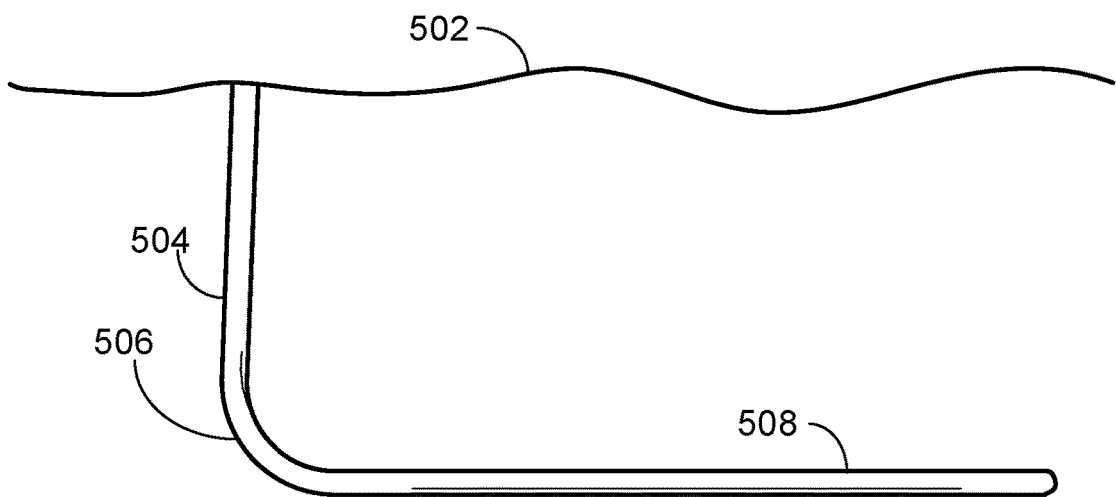

FIG. 5A is a top view, and FIGS. 5B-5C are side views, of schematic illustrations of another example implementation of a hazardous material storage repository system 500. As shown, the system includes a vertical drillhole 504 formed from a terranean surface 502. The vertical drillhole 504 is coupled to or continues into a transition drillhole 506. The transition drillhole 506 is coupled to or turns into an isolation drillhole 508. In this example, the isolation drillhole 508 includes or comprise an undulating drillhole in which the undulations are substantially side-to-side. As shown in FIG. 5B, the isolation drillhole 508 rises toward the terranean surface 502 and vertically away from the transition drillhole 506 as it undulates side-to-side. As shown in FIG. 5C, alternatively, the isolation drillhole 508 stays in a plane substantially parallel to the terranean surface 502 as it undulates side-to-side.

In some aspects, the spiral or undulating drillholes may be oriented without regard to the stress pattern of any gas or oil bearing layer in which they are formed. This is because the orientation need not take into account any fracturing of the drillhole as is the case for hydrocarbon production. Thus, drillhole geometers that are not oriented in the direction of the rock stress pattern, and are more compact, can be utilized. These drillholes may also have significant value in reducing the amount of terranean land under which the drillholes are formed. This may also reduce a cost of the land and of any mineral rights that must be bought to allow the hazardous material storage repository systems to be built. The drillholes are therefore determined not by the pattern of stresses in the rock, but primarily by the efficient and practical use of the available land.

Each of the drillholes shown in FIGS. 5A-5C may be cased or uncased; the casing may serve as an additional layer of protection to prevent hazardous material from reaching mobile water. If casing is omitted, then angular changes to any drillhole can be more rapid with a constraint being the accommodation of movement of any canister therethrough. If there is casing, angular changes in direction for the drillholes may be done sufficiently slowly (as they are in standard directional drilling) that the casing can be pushed into the drillhole. Further, in some aspects, all or a portion of the isolation drillhole 508 may be formed in or under an impermeable layer (as described in the present disclosure).

Referring generally to FIGS. 1A, 2, 3, 4A-4C, and 5A-5C, the example hazardous material storage repository systems (e.g., 100, 200, 300, 400, 450, 480, and 500) may provide for multiple layers of containment to ensure that a hazardous material (e.g., biological, chemical, nuclear) is sealingly stored in an appropriate subterranean layer. In some example implementations, there may be at least twelve layers of containment. In alternative implementations, a fewer or a greater number of containment layers may be employed.

First, using spent nuclear fuel as an example hazardous material, the fuel pellets are taken from the reactor and not modified. They may be made from sintered uranium dioxide ($UO_2$), a ceramic, and may remain solid and emit a variety of radioactive gases including tritium (13 year half-life), krypton-85 (10.8 year half-life), and carbon dioxide containing C-14 (5730 year half-life). Unless the pellets are exposed to extremely corrosive conditions or other effects that damage the multiple layers of containment, most of the radioisotopes (including the C-14, tritium or krypton-85) will be contained in the pellets.

Second, the fuel pellets are surrounded by the zircaloy tubes of the fuel rods, just as in the reactor. As described, the tubes could be mounted in the original fuel assemblies, or removed from those assemblies for tighter packing.

Third, the tubes are placed in the sealed housings of the hazardous material canister. The housing may be a unified structure or multi-panel structure, with the multiple panels (e.g., sides, top, bottom) mechanically fastened (e.g., screws, rivets, welds, and otherwise).

Fourth, a material (e.g., solid or fluid) may fill the hazardous material canister to provide a further buffer between the material and the exterior of the canister.

Fifth, the hazardous material canister(s) are positioned (as described above), in a drillhole that is lined with a steel or other sealing casing that extends, in some examples, throughout the entire drillhole (e.g., a substantially vertical portion, a radiussed portion, and a inclined portion). The casing is cemented in place, providing a relatively smooth surface (e.g., as compared to the drillhole wall) for the hazardous material canister to be moved through, thereby reducing the possibility of a leak or break during deposit or retrieval.

Sixth, the cement that holds or helps hold the casing in place, may also provide a sealing layer to contain the hazardous material should it escape the canister.

Seventh, the hazardous material canister is stored in a portion of the drillhole (e.g., the inclined portion) that is positioned within a thick (e.g., 100-200 feet) seam of a rock formation that comprises a storage layer. The storage layer may be chosen due at least in part to the geologic properties of the rock formation (e.g., only immobile water, low permeability, thick, appropriate ductility or non-brittleness). For example, in the case of shale as the rock formation of the storage layer, this type of rock may offers a level of containment since it is known that shale has been a seal for hydrocarbon gas for millions of years. The shale may contain brine, but that brine is demonstrably immobile, and not in communication with surface fresh water.

Eighth, in some aspects, the rock formation of the storage layer may have other unique geological properties that offer another level of containment. For example, shale rock often contains reactive components, such as iron sulfide, that reduce the likelihood that hazardous materials (e.g., spent nuclear fuel and its radioactive output) can migrate through the storage layer without reacting in ways that reduce the diffusion rate of such output even further. Further, the storage layer may include components, such as clay and organic matter, that typically have extremely low diffusivity. For example, shale may be stratified and composed of thinly alternating layers of clays and other minerals. Such a stratification of a rock formation in the storage layer, such as shale, may offer this additional layer of containment.

Ninth, the storage layer may be located deeper than, and under, an impermeable layer, which separates the storage layer (e.g., vertically) from a mobile water layer.

Tenth, the storage layer may be selected based on a depth (e.g., 3000 to 12,000 ft.) of such a layer within the subterranean layers. Such depths are typically far below any layers that contain mobile water, and thus, the sheer depth of the storage layer provides an additional layer of containment.

Eleventh, example implementations of the hazardous material storage repository system of the present disclosure facilitate monitoring of the stored hazardous material. For example, if monitored data indicates a leak or otherwise of the hazardous material (e.g., change in temperature, radioactivity, or otherwise), or even tampering or intrusion of the canister, the hazardous material canister may be retrieved for repair or inspection.

Twelfth, the one or more hazardous material canisters may be retrievable for periodic inspection, conditioning, or repair, as necessary (e.g., with or without monitoring). Thus, any problem with the canisters may be addressed without allowing hazardous material to leak or escape from the canisters unabated.

Thirteenth, even if hazardous material escaped from the canisters and no impermeable layer was located between the leaked hazardous material and the terranean surface, the leaked hazardous material may be contained within the drillhole at a location that has no upward path to the surface or to aquifers (e.g., mobile water layers) or to other zones that would be considered hazardous to humans. For example, the location, which may be a dead end of an inclined drillhole, a J-section drillhole, or peaks of a vertically undulating drillhole, may have no direct upward (e.g., toward the surface) path to a vertical portion of the drillhole.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A hazardous material storage repository, comprising:
   a drillhole that extends into the Earth from a terranean surface, the drillhole comprising an entry at least proximate the terranean surface, the drillhole comprising a substantially vertical drillhole portion and a hazardous material storage drillhole portion that is coupled to the substantially vertical drillhole portion and formed in a subterranean salt formation;
   a storage canister positioned in the hazardous material storage drillhole portion, the storage canister sized to fit from the drillhole entry through the substantially vertical drillhole portion, and into the hazardous material storage drillhole portion of the drillhole, the storage canister comprising an inner cavity sized to enclose nuclear waste material; and
   a seal positioned in the drillhole, the seal isolating the hazardous material storage drillhole portion of the drillhole from the entry of the drillhole.

2. The hazardous material storage repository of claim 1, wherein the nuclear waste material comprises plutonium.

3. The hazardous material storage repository of claim 1, wherein the subterranean salt formation comprises an impermeable formation layer.

4. The hazardous material storage repository of claim 3, wherein the impermeable formation layer is vertically isolated from a subterranean formation that comprises mobile water.

5. The hazardous material storage repository of claim 1, wherein the drillhole further comprises a substantially non-vertical drillhole portion.

6. The hazardous material storage repository of claim 5, wherein at least a portion of the substantially non-vertical drillhole portion comprises the hazardous material storage drillhole portion.

7. The hazardous material storage repository of claim 1, further comprising:
   a casing installed in at least a portion of the drillhole; and
   a cement layer installed adjacent the casing.

8. The hazardous material storage repository of claim 7, wherein the casing is installed in at least a portion of the substantially vertical drillhole portion.

9. The hazardous material storage repository of claim 1, wherein the seal is positioned in the substantially vertical drillhole portion.

10. The hazardous material storage repository of claim 1, wherein the storage canister comprises a first storage canister, the repository further comprising:
    a second storage canister positioned in the hazardous material storage drillhole portion adjacent the first storage canister, the second storage canister sized to fit from the drillhole entry through the substantially vertical drillhole portion, and into the hazardous material storage drillhole portion of the drillhole, the second storage canister comprising an inner cavity sized to enclose nuclear waste material.

11. The hazardous material storage repository of claim 1, wherein the nuclear waste material comprises military nuclear waste material.

12. The hazardous material storage repository of claim 11, wherein the subterranean salt formation comprises an impermeable formation layer.

13. The hazardous material storage repository of claim 12, wherein the impermeable formation layer is vertically isolated from a subterranean formation that comprises mobile water.

14. The hazardous material storage repository of claim 11, wherein the drillhole further comprises a substantially non-vertical drillhole portion.

15. The hazardous material storage repository of claim 14, wherein at least a portion of the substantially non-vertical drillhole portion comprises the hazardous material storage drillhole portion.

16. The hazardous material storage repository of claim 8, wherein the nuclear waste material comprises military nuclear waste material.

17. The hazardous material storage repository of claim 16, wherein the storage canister comprises a first storage canister, the repository further comprising:
   a second storage canister positioned in the hazardous material storage drillhole portion adjacent the first storage canister, the second storage canister sized to fit from the drillhole entry through the substantially vertical drillhole portion, and into the hazardous material storage drillhole portion of the drillhole, the second storage canister comprising an inner cavity sized to enclose military nuclear waste material.

18. The hazardous material storage repository of claim 11, further comprising:
   a casing installed in at least a portion of the drillhole; and
   a cement layer installed adjacent the casing.

19. The hazardous material storage repository of claim 18, wherein the subterranean salt formation comprises an impermeable formation layer, and the impermeable formation layer is vertically isolated from a subterranean formation that comprises mobile water.

20. The hazardous material storage repository of claim 19, wherein the drillhole further comprises a substantially non-vertical drillhole portion, and at least a portion of the substantially non-vertical drillhole portion comprises the hazardous material storage drillhole portion.

* * * * *